United States Patent
Dhavale

(10) Patent No.: US 12,471,912 B2
(45) Date of Patent: Nov. 18, 2025

(54) DEVICES AND METHODS FOR RETRACTING PROSTATIC TISSUE OF A PATIENT

(71) Applicant: Todd Dhavale, Bryn Mawr, PA (US)

(72) Inventor: Todd Dhavale, Bryn Mawr, PA (US)

(*) Notice: Subject to any disclaimer, the term of this patent is extended or adjusted under 35 U.S.C. 154(b) by 253 days.

(21) Appl. No.: 17/959,984

(22) Filed: Oct. 4, 2022

(65) Prior Publication Data
US 2023/0022482 A1 Jan. 26, 2023

Related U.S. Application Data

(63) Continuation of application No. PCT/US2021/025762, filed on Apr. 5, 2021.

(60) Provisional application No. 63/005,408, filed on Apr. 5, 2020.

(51) Int. Cl.
*A61B 17/06* (2006.01)
*A61B 17/00* (2006.01)

(52) U.S. Cl.
CPC .......... *A61B 17/06166* (2013.01); *A61B 2017/00274* (2013.01); *A61B 2017/00557* (2013.01); *A61B 2017/06176* (2013.01)

(58) Field of Classification Search
CPC .... A61B 17/06166; A61B 2017/00274; A61B 2017/00557; A61B 2017/06176
See application file for complete search history.

(56) References Cited

U.S. PATENT DOCUMENTS

| | | |
|---|---|---|
| 1,798,124 A | 3/1931 | Hunn |
| 4,932,956 A | 6/1990 | Reddy et al. |
| 5,030,227 A | 7/1991 | Rosenbluth et al. |
| 5,188,596 A | 2/1993 | Condon et al. |
| 5,232,443 A | 8/1993 | Leach |

(Continued)

FOREIGN PATENT DOCUMENTS

| | | |
|---|---|---|
| WO | 01/26588 A2 | 4/2001 |
| WO | 2023/014917 A1 | 2/2023 |

OTHER PUBLICATIONS

U.S. Patent and Trademark Office, "Notification of Transmittal of the International Search Report and Written Opinion of the International Searching Authority or the Declaration," issued in corresponding International Patent Application No. PCT/US2021/025762, mailed Sep. 2, 2021 (19 pages).

*Primary Examiner* — Tan-Uyen T Ho
*Assistant Examiner* — Cherie M Poland
(74) *Attorney, Agent, or Firm* — The Marbury Law Group, PLLC

(57) ABSTRACT

Implantable devices for retracting prostatic tissue of a patient are provided. In some embodiments, an implantable device may include a main body and a suture extending through at least a portion of the main body. The main body may be configured to extend through prostatic tissue of the patient such that a distal end portion of the main body resides at least partially outside of a prostatic capsule of the patient, and the distal end portion may be configured to deform from an undeformed configuration to a deformed configuration. The suture may include a first end and a second end extending from a proximal end of the main body, and the suture may be configured to cause the distal end portion to deform from the undeformed configuration to the deformed configuration when the first end and the second end are pulled proximally relative to the main body.

16 Claims, 17 Drawing Sheets

(56) References Cited

U.S. PATENT DOCUMENTS

| | | |
|---|---|---|
| 5,314,443 A | 5/1994 | Rudnick |
| 5,322,501 A | 6/1994 | Mahmud-Durrani |
| 5,383,889 A | 1/1995 | Warner et al. |
| 5,402,772 A | 4/1995 | Moll et al. |
| 5,499,994 A | 3/1996 | Tihon et al. |
| 5,645,528 A | 7/1997 | Thome |
| 5,735,845 A | 4/1998 | Zupkas |
| 5,964,806 A | 10/1999 | Cook et al. |
| 6,045,498 A | 4/2000 | Burton et al. |
| 6,048,309 A | 4/2000 | Flom et al. |
| 6,228,116 B1 | 5/2001 | Ledergerber |
| 6,468,205 B1 | 10/2002 | Mollenauer et al. |
| 6,494,879 B2 | 12/2002 | Lennox et al. |
| 6,517,566 B1 | 2/2003 | Hovland |
| 6,616,678 B2 | 9/2003 | Nishtala et al. |
| 6,716,252 B2 | 4/2004 | Lazarovitz et al. |
| 6,991,596 B2 | 1/2006 | Whalen et al. |
| 7,758,594 B2 | 7/2010 | Lamson et al. |
| 8,663,243 B2 | 3/2014 | Lamson et al. |
| 8,715,239 B2 | 5/2014 | Lamson et al. |
| 8,715,298 B2 | 5/2014 | Catanese, III et al. |
| 8,900,252 B2 | 12/2014 | Lamson et al. |
| 10,035,005 B2 | 7/2018 | Bar-On et al. |
| 11,273,025 B2 | 3/2022 | Ghriallais et al. |
| 2006/0122462 A1 | 6/2006 | Roth et al. |
| 2008/0147109 A1 | 6/2008 | Kambin et al. |
| 2008/0243151 A1 | 10/2008 | Binmoeller et al. |
| 2011/0040312 A1 | 2/2011 | Lamson et al. |
| 2011/0226264 A1* | 9/2011 | Friedman ............... A61B 1/267 128/848 |
| 2015/0257908 A1 | 9/2015 | Chao et al. |
| 2017/0100125 A1* | 4/2017 | Catanese, III ... A61B 17/00491 |
| 2018/0318114 A1 | 11/2018 | Huang et al. |
| 2019/0117423 A1 | 4/2019 | Chao et al. |
| 2021/0307942 A1 | 10/2021 | Flora et al. |
| 2023/0181884 A1 | 6/2023 | Ni Ghriallais et al. |

\* cited by examiner

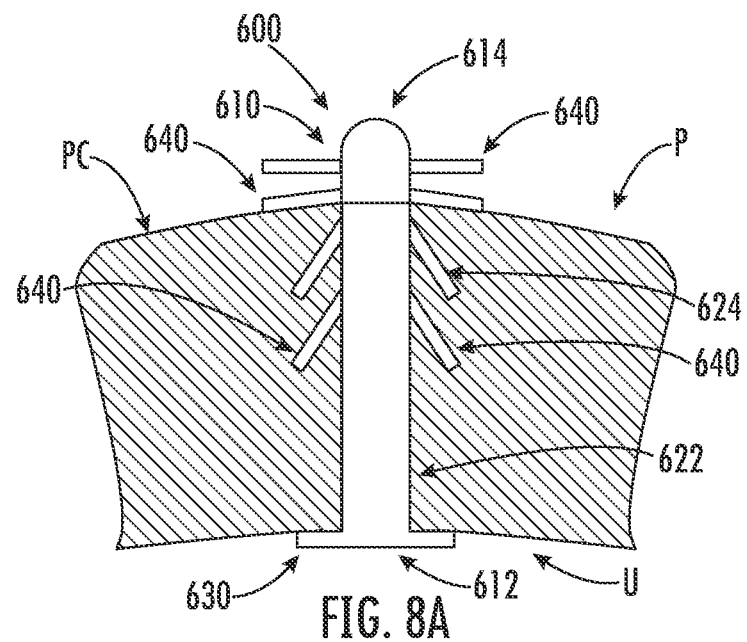
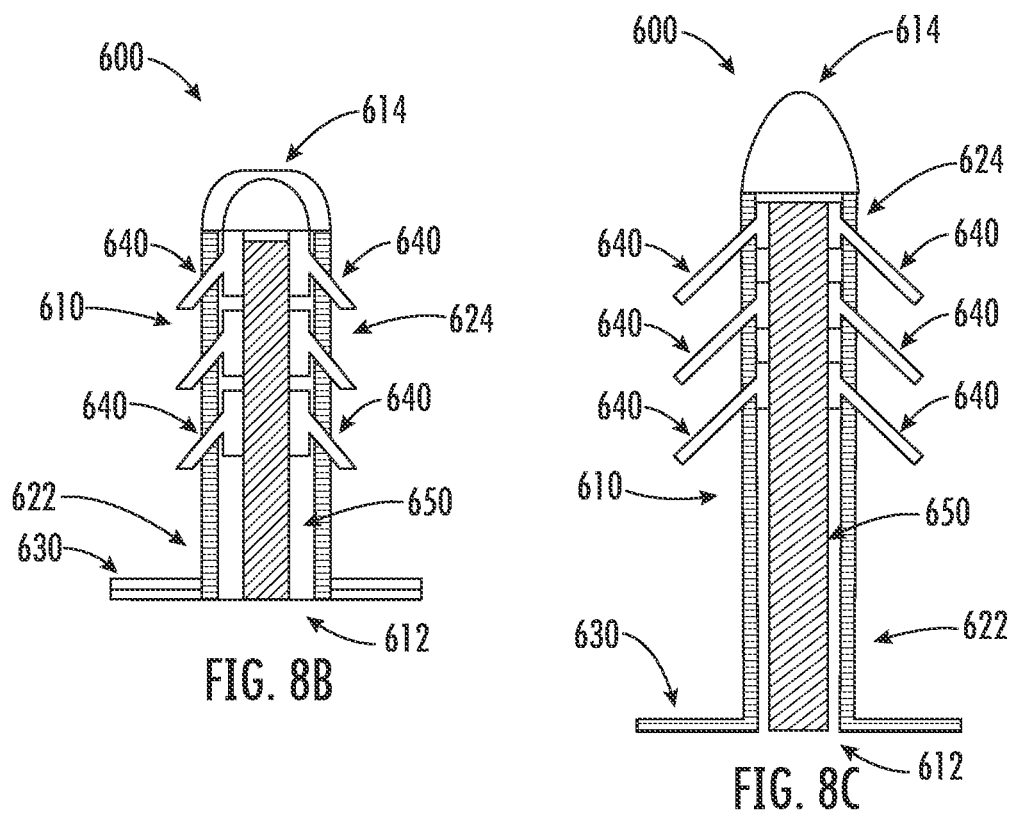

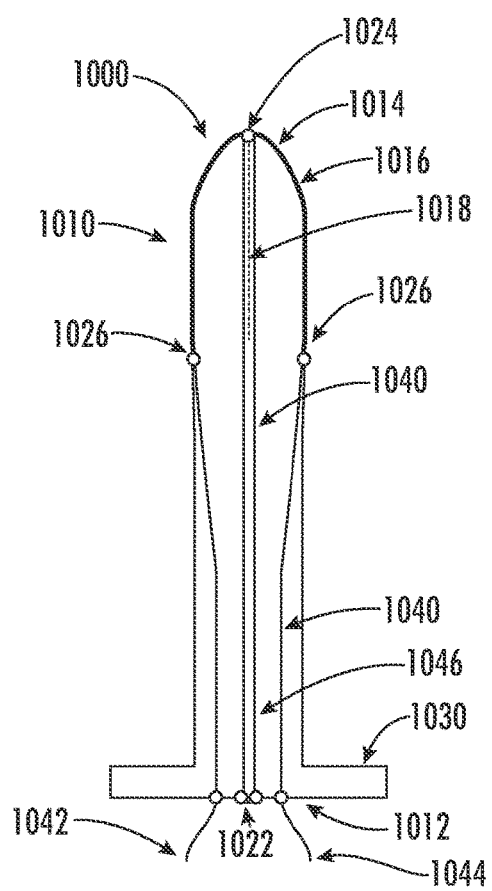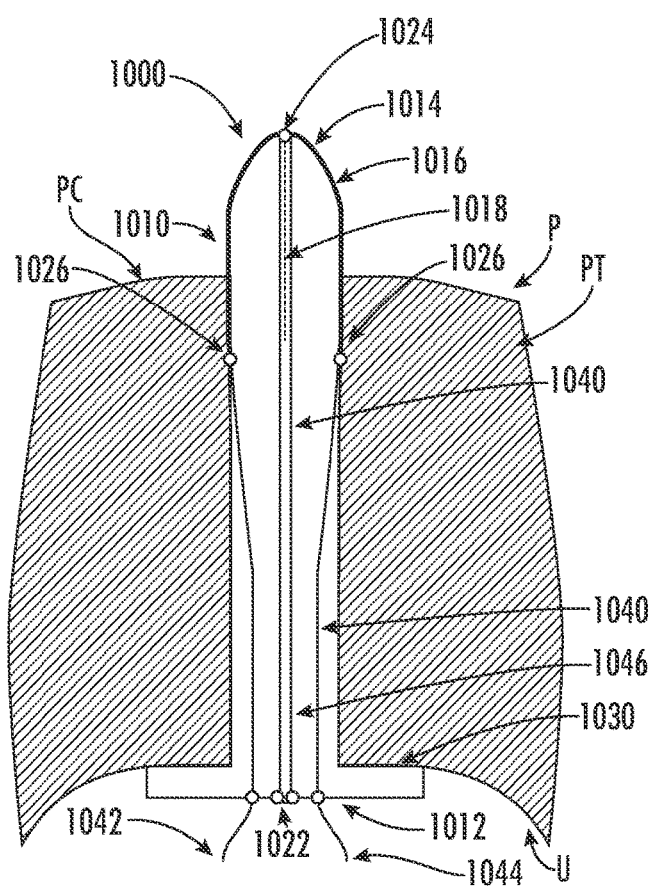
FIG. 12A  FIG. 12B
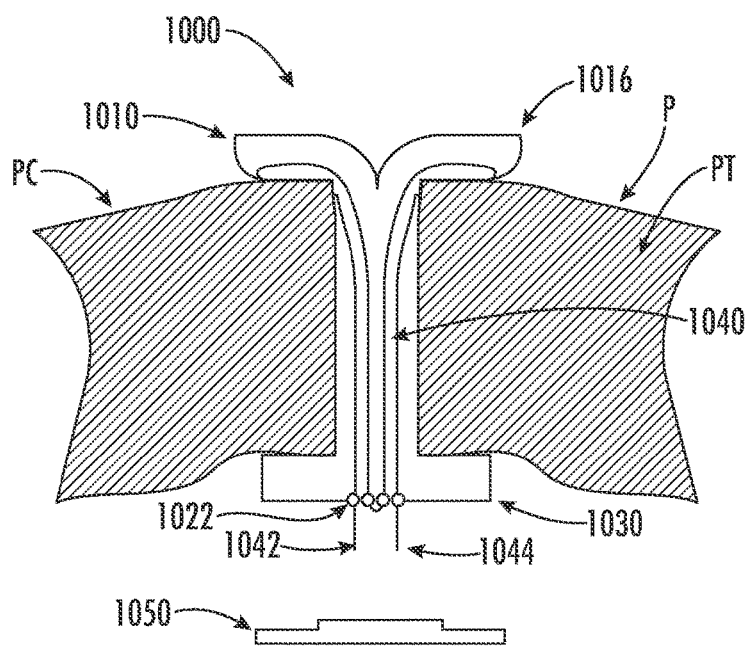
FIG. 12C

DEVICES AND METHODS FOR RETRACTING PROSTATIC TISSUE OF A PATIENT

CROSS-REFERENCE TO RELATED APPLICATIONS

This application is a continuation of International Patent Application No. PCT/US2021/025762, filed on Apr. 5, 2021, which claims priority to and the benefit of U.S. Provisional Patent Application No. 63/005,408, filed on Apr. 5, 2020, with the entire disclosure of each of these applications incorporated herein by reference.

FIELD OF THE DISCLOSURE

The present disclosure relates generally to techniques for treatment of lower urinary tract symptoms and more particularly to implantable devices for retracting prostatic tissue of a patient and related methods of using the same.

BACKGROUND OF THE DISCLOSURE

Benign prostatic hyperplasia (BPH) affects a large majority of older men, and traditional solutions to address the condition are not without significant issues. It is estimated that over 40% of men in their 50s have BPH, over 70% of men in their 60s have the condition, and approximately 80% of men over the age of 70 have it. BPH is a non-cancerous enlargement of the prostate gland that causes an increasing stricture of the urethra as the prostate grows, resulting in lower urinary tract symptoms (LUTS) such as frequent urination, urge incontinence, increased frequency of urination at night, and a weak stream with difficulty starting urination—symptoms that are familiar to older men and their loved ones. If left untreated, BPH can worsen over time and cause permanent kidney and bladder damage.

Currently, LUTS due to BPH often are managed medically with alpha-1a-adrenergic receptors blockers and 5-alpha-reductase inhibitors (SARI). These medications cause the prostate tissue to be less contractile and shrink in size, respectively, thus attempting to reduce LUTS. While easy to administer, these drugs are not without complications that can lead to patient dropout. They can take up to six months for initial relief, and the majority of patients do not experience a clinically significant improvement in symptoms. More importantly, side effects of these medications can include headaches, dizziness, nasal congestion, and ejaculatory and erectile disfunction, leading to patient nonadherence.

On the other end of the treatment spectrum, the alternatives to drugs are surgical options to completely excise the prostatic tissue that is impinging on the urethra. Surgical BPH procedures are lengthy and performed in an operating-room setting, with general or extensive spinal anesthesia required. The gold-standard treatment for BPH is transurethral resection of the prostate (TURP), an invasive procedure in which prostate tissue is removed through the urethra using an electrocautery tool. Other surgical options involve ablation of prostate tissue by microwave, laser, or heat energy. For all of these procedures, several weeks of recovery are required, and it can take up to six months for patients to experience symptom relief. Morbidities such as temporary difficulty urinating, prolonged heavy bleeding, pain, and permanent sexual side-effects can occur post-procedure and affect patient satisfaction with their treatment choice.

In between medical management and surgical tissue removal are minimally-invasive options that mechanically displace the impinging prostate tissue and open the urethra. Vascular stent-like devices have been tried, but implant migration and excessive tissue ingrowth have proved problematic and limited interest in these approaches. Other configurations of minimally-invasive devices for displacing prostate tissue have been explored. Currently, only one such device is commercially available to patients, but it has important limitations. For example, removability of the device post-deployment is challenging. Additionally, the device lacks a means for achieving a desired degree of tissue retraction to meet a patient's specific needs.

A need therefore exists for improved implantable devices and methods for retracting prostatic tissue of a patient, which may overcome one or more of the above-mentioned problems associated with existing devices and their use.

SUMMARY OF THE DISCLOSURE

The present disclosure provides implantable devices and related methods for retracting prostatic tissue of a patient. According to one aspect, an implantable device for retracting prostatic tissue of a patient is provided. In one embodiment, the implantable device may include a main body and a suture. The main body may have a proximal end and a distal end disposed opposite one another in a direction of a longitudinal axis of the main body, and the main body may be configured to extend through prostatic tissue of the patient such that a distal end portion of the main body resides at least partially outside of a prostatic capsule of the patient. The distal end portion may be configured to deform from an undeformed configuration to a deformed configuration. The suture may extend through at least a portion of the main body and may include a first end and a second end extending from the proximal end of the main body. The suture may be configured to cause the distal end portion to deform from the undeformed configuration to the deformed configuration when the first end and the second end are pulled proximally relative to the main body.

In some embodiments, the distal end portion may be configured to deform radially outward relative to the longitudinal axis from the undeformed configuration to the deformed configuration. In some embodiments, the distal end portion may include one or more zones of weakness configured to facilitate deformation of the distal end portion from the undeformed configuration to the deformed configuration. In some embodiments, the one or more zones of weakness may include perforations defined in the distal end portion. In some embodiments, a portion of the suture may extend through the main body from the proximal end to the distal end of the main body. In some embodiments, the main body may include a proximal end opening positioned at the proximal end of the main body and a distal end opening positioned at the distal end of the main body, and the portion of the suture may extend through the main body from the proximal end opening to the distal end opening. In some embodiments, a portion of the suture may extend along an outer surface of the distal end portion. In some embodiments, the main body may include a distal end opening positioned at the distal end of the main body and a side opening positioned between the proximal end and the distal end of the main body, and the portion of the suture may extend along the outer surface of the distal end portion from the distal end opening to the side opening. In some embodiments, the main body also may include a proximal end opening positioned at the proximal end of the main body, and another portion of the suture may extend through the main body from the side opening to the proximal end opening. In some embodiments, the implantable device also may include a flange fixedly attached to the main body and configured to reside within the prostatic urethra of the patient.

According to another aspect, a method for retracting prostatic tissue of a patient is provided. In one embodiment, the method may include advancing a main body of an implantable device through prostatic tissue of the patient such that a distal end portion of the main body resides at least partially outside of a prostatic capsule of the patient, positioning a flange of the implantable device within a prostatic urethra of the patient and in contact with the prostatic tissue, and deforming the distal end portion from an undeformed configuration to a deformed configuration by pulling a suture of the implantable device relative to the main body such that the prostatic tissue is retracted.

In some embodiments, deforming the distal end portion from the undeformed configuration to the deformed configuration may cause the prostatic tissue to be compressed between the flange and the distal end portion. In some embodiments, deforming the distal end portion from the undeformed configuration to the deformed configuration may include deforming the distal end portion radially outward relative to a longitudinal axis of the main body. In some embodiments, deforming the distal end portion from the undeformed configuration to the deformed configuration may include separating respective segments of the distal end portion from one another. In some embodiments, the distal end portion may include one or more zones of weakness configured to facilitate separation of the respective segments of the distal end portion from one another. In some embodiments, the one or more zones of weakness may include perforations defined in the distal end portion. In some embodiments, the suture may include a first end and a second end extending from a proximal end of the main body, and pulling the suture relative to the main body may include pulling the first end and the second end proximally relative to the main body. In some embodiments, a portion of the suture may extend through the main body from a proximal end to a distal end of the main body. In some embodiments, a portion of the suture may extend along an outer surface of the distal end portion. In some embodiments, the method also may include, after pulling the suture relative to the main body, securing a first end portion and a second end portion of the suture relative to the main body.

According to another aspect, an implantable device for retracting prostatic tissue of a patient is provided. In one embodiment, the implantable device may include a shaft, a proximal balloon, a distal balloon, and an intermediate balloon. The shaft may have a proximal end and a distal end disposed opposite one another in a direction of a longitudinal axis of the shaft. The proximal balloon may be fixedly attached to the shaft and positioned closer to the proximal end than the distal end. The distal balloon may be fixedly attached to the shaft and positioned closer to the distal end than the proximal end. The intermediate balloon may be fixedly attached to the shaft and positioned between the proximal balloon and the distal balloon. The shaft may include a first lumen in fluid communication with a reservoir of the proximal balloon and a reservoir of the distal balloon and in fluid isolation from a reservoir of the intermediate balloon.

In some embodiments, the proximal balloon may be positioned at the proximal end of the shaft, and the distal balloon may be positioned at the distal end of the shaft. In some embodiments, the intermediate balloon may be positioned closer to the distal balloon than the proximal balloon. In some embodiments, the shaft further may include a second lumen in fluid communication with the reservoir of the intermediate balloon and in fluid isolation from the reservoir of the proximal balloon and the reservoir of the distal balloon. In some embodiments, the shaft may have a first diameter in a direction perpendicular to the longitudinal axis, the proximal balloon may be configured to expand to an expanded configuration in which the proximal balloon has a second diameter in the direction perpendicular to the longitudinal axis, and the second diameter may be greater than the first diameter. In some embodiments, the proximal balloon may have a length in the direction of the longitudinal axis when the proximal balloon is in the expanded configuration, and the second diameter may be greater than the length. In some embodiments, the shaft may have a first diameter in a direction perpendicular to the longitudinal axis, the distal balloon may be configured to expand to an expanded configuration in which the distal balloon has a second diameter in the direction perpendicular to the longitudinal axis, and the second diameter may be greater than the first diameter. In some embodiments, the distal balloon may have a length in the direction of the longitudinal axis when the distal balloon is in the expanded configuration, and the second diameter may be greater than the length. In some embodiments, the shaft may have a first diameter in a direction perpendicular to the longitudinal axis, the intermediate balloon may be configured to expand to an expanded configuration in which the intermediate balloon has a second diameter in the direction perpendicular to the longitudinal axis, and the second diameter may be greater than the first diameter. In some embodiments, the intermediate balloon may have a length in the direction of the longitudinal axis when the intermediate balloon is in the expanded configuration, and the second diameter may be less than the length.

According to another aspect, an implantable device for retracting prostatic tissue of a patient is provided. In one embodiment, the implantable device may include a shaft, a proximal balloon, a distal balloon, and an intermediate balloon. The shaft may have a proximal end and a distal end disposed opposite one another in a direction of a longitudinal axis of the shaft. The shaft may be configured to extend through prostatic tissue of the patient. The proximal balloon may be fixedly attached to the shaft and positioned closer to the proximal end than the distal end. The proximal balloon may be configured to reside within a prostatic urethra of the patient. The distal balloon may be fixedly attached to the shaft and positioned closer to the distal end than the proximal end. The distal balloon may be configured to reside outside of a prostatic capsule of the patient. The intermediate balloon may be fixedly attached to the shaft and positioned between the proximal balloon and the distal balloon. The intermediate balloon may be configured to reside outside of the prostatic capsule of the patient. The shaft may include a first lumen in fluid communication with a reservoir of the proximal balloon and a reservoir of the distal balloon and in fluid isolation from a reservoir of the intermediate balloon.

In some embodiments, the proximal balloon may be positioned at the proximal end of the shaft, and the distal balloon may be positioned at the distal end of the shaft. In some embodiments, the intermediate balloon may be positioned closer to the distal balloon than the proximal balloon. In some embodiments, the shaft further may include a second lumen in fluid communication with the reservoir of the intermediate balloon and in fluid isolation from the reservoir of the proximal balloon and the reservoir of the distal balloon. In some embodiments, the shaft may have a first diameter in a direction perpendicular to the longitudinal axis, the proximal balloon may be configured to expand to an expanded configuration in which the proximal balloon has a second diameter in the direction perpendicular to the longitudinal axis, and the second diameter may be greater than the first diameter. In some embodiments, the proximal balloon may have a length in the direction of the longitudinal axis when the proximal balloon is in the expanded configuration, and the second diameter may be greater than the length. In some embodiments, the shaft may have a first diameter in a direction perpendicular to the longitudinal axis, the distal balloon may be configured to expand to an expanded configuration in which the distal balloon has a second diameter in the direction perpendicular to the longitudinal axis, and the second diameter may be greater than the first diameter. In some embodiments, the distal balloon may have a length in the direction of the longitudinal axis when the distal balloon is in the expanded configuration, and the second diameter may be greater than the length. In some embodiments, the shaft may have a first diameter in a direction perpendicular to the longitudinal axis, the intermediate balloon may be configured to expand to an expanded configuration in which the intermediate balloon has a second diameter in the direction perpendicular to the longitudinal axis, and the second diameter may be greater than the first diameter. In some embodiments, the intermediate balloon may have a length in the direction of the longitudinal axis when the intermediate balloon is in the expanded configuration, and the second diameter may be less than the length.

According to another aspect, a method for retracting prostatic tissue of a patient is provided. In one embodiment, the method may include advancing an implantable device at least partially through prostatic tissue of the patient, positioning a shaft of the implantable device at least partially within the prostatic tissue, expanding a proximal balloon of the implantable device within a prostatic urethra of the patient, expanding a distal balloon of the implantable device outside of a prostatic capsule of the patient, and expanding an intermediate balloon of the implantable device outside of the prostatic capsule such that the prostatic tissue is retracted.

In some embodiments, the proximal balloon and the distal balloon may be expanded simultaneously. In some embodiments, the proximal balloon and the distal balloon may be expanded while the intermediate balloon is in a collapsed configuration. In some embodiments, the intermediate balloon may be expanded after the proximal balloon and the distal balloon are expanded. In some embodiments, the expansion of the intermediate balloon may cause the prostatic tissue to be compressed between the proximal balloon and the intermediate balloon. In some embodiments, the method also may include forming a channel through the prostatic tissue from the prostatic urethra to the prostatic capsule. Advancing the implantable device at least partially through the prostatic tissue may include advancing the implantable device at least partially through the channel. The proximal balloon, the distal balloon, and the intermediate balloon each may be expanded to have a diameter greater than a diameter of the channel. In some embodiments, advancing the implantable device at least partially through the prostatic tissue may include advancing the distal balloon and the intermediate balloon through the prostatic tissue while the distal balloon is in a collapsed configuration and the intermediate balloon is in a collapsed configuration.

In some embodiments, the proximal balloon, the distal balloon, and the intermediate balloon may be fixedly attached to the shaft. In some embodiments, the shaft may have a proximal end and a distal end disposed opposite one another in a direction of a longitudinal axis of the shaft, the proximal balloon may be positioned closer to the proximal end than the distal end, the distal balloon may be positioned closer to the distal end than the proximal end, and the intermediate balloon may be positioned between the proximal balloon and the distal balloon. In some embodiments, the intermediate balloon may be positioned closer to the distal balloon than the proximal balloon.

According to another aspect, a method for retracting prostatic tissue of a patient is provided. In one embodiment, the method may include advancing an implantable device at least partially through prostatic tissue of the patient, positioning a shaft of the implantable device at least partially within the prostatic tissue, expanding a proximal balloon of the implantable device within a prostatic urethra of the patient, and expanding a distal balloon of the implantable device outside of a prostatic capsule of the patient such that the prostatic tissue is retracted.

In some embodiments, the distal balloon may be expanded after the proximal balloon is expanded. In some embodiments, expanding the distal balloon may include radially expanding the distal balloon and longitudinally expanding the distal balloon. In some embodiments, the expansion of the distal balloon may cause the prostatic tissue to be compressed between the proximal balloon and the distal balloon. In some embodiments, the method also may include forming a channel through the prostatic tissue from the prostatic urethra to the prostatic capsule, and advancing the implantable device at least partially through the prostatic tissue may include advancing the implantable device at least partially through the channel. In some embodiments, the proximal balloon and the distal balloon each may be expanded to have a diameter greater than a diameter of the channel. In some embodiments, advancing the implantable device at least partially through the prostatic tissue may include advancing the distal balloon through the prostatic tissue while the distal balloon is in a collapsed configuration. In some embodiments, the proximal balloon and the distal balloon may be fixedly attached to the shaft. In some embodiments, the shaft may have a proximal end and a distal end disposed opposite one another in a direction of a longitudinal axis of the shaft, the proximal balloon may be positioned closer to the proximal end than the distal end, and the distal balloon may be positioned closer to the distal end than the proximal end. In some embodiments, the distal balloon may be expanded to have a length greater than a length of the proximal balloon.

According to another aspect, an implantable device for retracting prostatic tissue of a patient is provided. In one embodiment, the implantable device may include a main body, a flange, and a plurality of barbs. The main body may have a proximal end and a distal end disposed opposite one another in a direction of a longitudinal axis of the main body, and the main body may be configured to extend at least partially through prostatic tissue of the patient. The flange may be fixedly attached to a proximal end portion of the main body, and the flange may be configured to reside within a prostatic urethra of the patient. The barbs may be attached to a distal end portion of the main body and extend outward therefrom, and the barbs may be configured to engage the prostatic tissue. Each of the barbs may be configured to move relative to the main body between a first configuration and a second configuration.

In some embodiments, the flange may be positioned at the proximal end of the main body. In some embodiments, the barbs may be spaced apart from the distal end of the main body. In some embodiments, the barbs may be integrally formed with the main body. In some embodiments, each of the barbs may be fixedly attached to the main body and configured to be elastically deformed or deflected from the first configuration to the second configuration. In some embodiments, each of the barbs may have a free end that is positioned closer to the main body in the second configuration than in the first configuration. In some embodiments, the barbs may be separately formed from the main body. In some embodiments, each of the barbs may extend through a respective opening defined in the main body, and each of the barbs may include a base portion positioned within the main body and a free end portion positioned outside of the main body. In some embodiments, the implantable device also may include a central pin that is removably positioned within the main body, and the central pin may be configured to inhibit movement of the barbs relative to the main body when the central pin is positioned within the main body. In some embodiments, each of the barbs may be pivotally attached to the main body and configured to pivot between the first configuration and the second configuration.

According to another aspect, a method for retracting prostatic tissue of a patient is provided. In one embodiment, the method may include advancing a main body of an implantable device at least partially through prostatic tissue of the patient, advancing a plurality of barbs of the implantable device at least partially through the prostatic tissue, and positioning a flange of the implantable device within a prostatic urethra of the patient and in contact with the prostatic tissue such that the prostatic tissue is retracted.

In some embodiments, positioning the flange in contact with the prostatic tissue may cause the prostatic tissue to be compressed between the flange and one or more of the barbs. In some embodiments, advancing the main body at least partially through the prostatic tissue may include advancing a distal end of the main body through the prostatic tissue such that the distal end is positioned outside of a prostatic capsule of the patient. In some embodiments, advancing the plurality of barbs at least partially through the prostatic tissue may cause the barbs to move relative to the main body between a first configuration and a second configuration. In some embodiments, the barbs may be elastically deformed or deflected from the first configuration to the second configuration. In some embodiments, the barbs may pivot from the first configuration to the second configuration. In some embodiments, advancing the plurality of barbs at least partially through the prostatic tissue may include advancing one or more of the barbs through the prostatic tissue such that the one or more of the barbs are positioned outside of a prostatic capsule of the patient. In some embodiments, the plurality of barbs may include one or more first barbs and one or more second barbs, and the method also may include positioning the one or more first barbs within the prostatic tissue, and positioning the one or more second barbs outside of a prostatic capsule of the patient. In some embodiments, the barbs may be integrally formed with the main body. In some embodiments, the barbs may be separately formed from the main body.

According to another aspect, an implantable device for retracting prostatic tissue of a patient is provided. In one embodiment, the implantable device may include a distal body, a plurality of barbs, a proximal body, and a tether. The distal body may have a proximal end and a distal end disposed opposite one another in a direction of a longitudinal axis of the distal body, and the distal body may be configured to extend at least partially through prostatic tissue of the patient. The barbs may be attached to the distal body and extend outward therefrom, and the barbs may be configured to engage the prostatic tissue. The proximal body may be configured to reside within a prostatic urethra of the patient. The tether may extend between the distal body and the proximal body, and the tether may be configured to extend at least partially through the prostatic tissue.

In some embodiments, each of the barbs may be configured to move relative to the distal body between a first configuration and a second configuration. In some embodiments, each of the barbs may be fixedly attached to the distal body and configured to be elastically deformed or deflected from the first configuration to the second configuration. In some embodiments, the tether may be fixedly attached to each of the distal body and the proximal body. In some embodiments, the tether may be flexible. In some embodiments, the tether may include a suture. In some embodiments, the implantable device also may include an intermediate body extending between the distal body and the proximal body, and the intermediate body may be configured to extend at least partially through the prostatic tissue. In some embodiments, the intermediate body may be formed of a bioerodeable material. In some embodiments, the intermediate body may be fixedly attached to each of the distal body and the proximal body. In some embodiments, the intermediate body may surround the tether.

According to another aspect, a method for retracting prostatic tissue of a patient is provided. In one embodiment, the method may include advancing a distal body of an implantable device at least partially through prostatic tissue of the patient, advancing a plurality of barbs of the implantable device at least partially through the prostatic tissue, positioning a tether of the implantable device at least partially within the prostatic tissue, and positioning a proximal body of the implantable device within a prostatic urethra of the patient and in contact with the prostatic tissue such that the prostatic tissue is retracted. The tether may extend between the distal body and the proximal body.

In some embodiments, positioning the proximal body in contact with the prostatic tissue may cause the prostatic tissue to be compressed between the proximal body and one or more of the barbs. In some embodiments, advancing the distal body at least partially through the prostatic tissue may include advancing a distal end of the distal body through the prostatic tissue such that the distal end is positioned outside of a prostatic capsule of the patient. In some embodiments, advancing the plurality of barbs at least partially through the prostatic tissue may cause the barbs to move relative to the distal body between a first configuration and a second configuration. In some embodiments, the barbs may be elastically deformed or deflected from the first configuration to the second configuration. In some embodiments, advancing the plurality of barbs at least partially through the prostatic tissue may include advancing one or more of the barbs through the prostatic tissue such that the one or more of the barbs are positioned outside of a prostatic capsule of the patient. In some embodiments, the plurality of barbs may include one or more first barbs and one or more second barbs, and the method also may include positioning the one or more first barbs within the prostatic tissue, and positioning the one or more second barbs outside of a prostatic capsule of the patient. In some embodiments, the method also may include positioning an intermediate body of the implantable device at least partially within the prostatic tissue, and the intermediate body may extend between the distal body and the proximal body. In some embodiments, the intermediate body may be formed of a bioerodeable material and configured to erode within the prostatic tissue. In some embodiments, the intermediate body may be fixedly attached to each of the distal body and the proximal body, and the intermediate body may surround the tether.

According to another aspect, an implantable device for retracting prostatic tissue of a patient is provided. In one embodiment, the implantable device may include a distal body, a proximal body, a shaft, and two pairs of link arms. The distal body may be configured to reside outside of a prostatic capsule of the patient. The proximal body may be configured to reside within a prostatic urethra of the patient. The shaft may be movably attached to each of the distal body and the proximal body, and the shaft may be configured to extend through prostatic tissue of the patient. The pairs of link arms may extend between the distal body and the proximal body, and each pair of link arms may be configured to extend through the prostatic tissue.

In some embodiments, the shaft may be threadedly attached to the distal body. In some embodiments, the shaft may be rotatably attached to the proximal body. In some embodiments, the shaft may be configured to move the distal body toward the proximal body when the shaft is rotated relative to the proximal body in a first direction. In some embodiments, the shaft may be configured to move the distal body away from the proximal body when the shaft is rotated relative to the proximal body in a second direction opposite the first direction. In some embodiments, each pair of link arms may include a first link arm pivotally attached to the distal body, and a second link arm pivotally attached to each of the proximal body and the first link arm. In some embodiments, the implantable device also may include a plurality of barbs attached to the distal body and extending outward therefrom, and the barbs may be configured to reside outside of the prostatic capsule. In some embodiments, each of the barbs may be configured to move relative to the distal body between a first configuration and a second configuration. In some embodiments, each of the barbs may be pivotally attached to the distal body and configured to pivot from the first configuration to the second configuration. In some embodiments, each of the barbs may be fixedly attached to the distal body and configured to be elastically deformed or deflected from the first configuration to the second configuration.

According to another aspect, a method for retracting prostatic tissue of a patient is provided. In one embodiment, the method may include advancing a shaft of an implantable device through prostatic tissue of the patient, positioning a distal body of the implantable device outside of a prostatic capsule of the patient, positioning a proximal body of the implantable device within a prostatic urethra of the patient and in contact with the prostatic tissue, and moving the distal body toward the proximal body by rotating the shaft relative to the proximal body such that the prostatic tissue is retracted.

In some embodiments, moving the distal body toward the proximal body may cause the prostatic tissue to be compressed between the distal body and the proximal body. In some embodiments, advancing the shaft through the prostatic tissue may include advancing the shaft through the prostatic tissue such that a distal end of the shaft is positioned outside of the prostatic capsule and a proximal end of the shaft is positioned within the prostatic urethra. In some embodiments, the shaft may be threadedly attached to the distal body. In some embodiments, the shaft may be rotatably attached to the proximal body. In some embodiments, the method also may include advancing two pairs of link arms through the prostatic tissue, and each pair of link arms may extend between the distal body and the proximal body. In some embodiments, each pair of link arms may include a first link arm pivotally attached to the distal body, and a second link arm pivotally attached to each of the proximal body and the first link arm. In some embodiments, the method also may include advancing a plurality of barbs through the prostatic tissue. In some embodiments, the method also may include positioning the barbs outside of the prostatic capsule and in contact with the prostatic capsule. In some embodiments, moving the distal body toward the proximal body may cause the prostatic tissue to be compressed between the barbs and the proximal body.

According to another aspect, an implantable device for retracting prostatic tissue of a patient is provided. In one embodiment, the implantable device may include a distal body, a plurality of barbs, a proximal body, and a fluid. The distal body may have a proximal end and a distal end disposed opposite one another in a direction of a longitudinal axis of the distal body. The distal body may define a reservoir within the distal body, and the distal body may be configured to extend at least partially through prostatic tissue of the patient. The barbs may be attached to the main body and extend outward therefrom, and the barbs may be configured to engage the prostatic tissue. The proximal body may be movably attached to the distal body and may define a reservoir within the proximal body and in fluid communication with the reservoir of the distal body. The proximal body may be configured to extend at least partially through the prostatic tissue and to reside partially within a prostatic urethra of the patient. The fluid may be contained within the reservoir of the distal body and the reservoir of the proximal body.

In some embodiments, each of the barbs may be configured to move relative to the distal body between a first configuration and a second configuration. In some embodiments, each of the barbs may be pivotally attached to the distal body and configured to pivot from the first configuration to the second configuration. In some embodiments, each of the barbs may be fixedly attached to the distal body and configured to be elastically deformed or deflected from the first configuration to the second configuration. In some embodiments, the proximal body may be translatably attached to the distal body and configured to translate relative to the distal body from an extended configuration and a retracted configuration. In some embodiments, the implantable device also may include a seal positioned at an interface between the distal body and the proximal body. In some embodiments, the implantable device also may include a port configured to allow the fluid to be withdrawn from the reservoir of the proximal body. In some embodiments, the port may be positioned at a proximal end of the proximal body. In some embodiments, the port may include a valve. In some embodiments, the implantable device also may include a flange fixedly attached to the proximal body, wherein the flange is configured to reside within the prostatic urethra.

According to another aspect, a method for retracting prostatic tissue of a patient is provided. In one embodiment, the method may include advancing a distal body of an implantable device at least partially through prostatic tissue of the patient, advancing a plurality of barbs of the implantable device at least partially through the prostatic tissue, advancing a proximal body of the implantable device at least partially through the prostatic tissue, the proximal body being movably attached to the distal body, and positioning a flange of the implantable device within a prostatic urethra of the patient and in contact with the prostatic tissue such that the prostatic tissue is retracted.

In some embodiments, positioning the flange in contact with the prostatic tissue may cause the prostatic tissue to be compressed between the flange and one or more of the barbs. In some embodiments, advancing the distal body at least partially through the prostatic tissue may include advancing a distal end of the distal body through the prostatic tissue such that the distal end is positioned outside of a prostatic capsule of the patient. In some embodiments, advancing the plurality of barbs at least partially through the prostatic tissue may cause the barbs to move relative to the distal body between a first configuration and a second configuration. In some embodiments, the barbs may pivot from the first configuration to the second configuration. In some embodiments, the barbs may be elastically deformed or deflected from the first configuration to the second configuration. In some embodiments, advancing the plurality of barbs at least partially through the prostatic tissue may include advancing one or more of the barbs through the prostatic tissue such that the one or more of the barbs are positioned outside of a prostatic capsule of the patient. In some embodiments, the method also may include translating the proximal body relative to the distal body from an extended configuration to a retracted configuration. In some embodiments, the distal body may define a reservoir within the distal body, the proximal body may define a reservoir within the proximal body and in fluid communication with the reservoir of the distal body, and translating the proximal body relative to the distal body from the extended configuration to the retracted configuration may include withdrawing a portion of a fluid contained within the reservoir of the proximal body. In some embodiments, withdrawing the portion of the fluid contained within the reservoir of the proximal body may include withdrawing the portion of the fluid via a port positioned at a proximal end of the proximal body.

According to another aspect, an implantable device for retracting prostatic tissue of a patient is provided. In one embodiment, the implantable device may include a shaft, a first locking tab movably attached to the shaft, and a second locking tab movably attached to the shaft. The shaft may have a first end and a second end disposed opposite one another. The shaft may include a central portion positioned between the first end and the second end, a first end portion extending from the central portion to the first end, and a second end portion extending from the central portion to the second end. The first end portion may include a plurality of first protrusions or recesses. The second end portion may include a plurality of second protrusions or recesses. The first protrusions or recesses may be configured to allow the first locking tab to move along the first end portion toward the first end and to inhibit movement of the first locking tab along the first end portion toward the second end. The second protrusions or recesses may be configured to allow the second locking tab to move along the second end portion toward the second end and to inhibit movement of the second locking tab along the second end portion toward the first end.

In some embodiments, the shaft may be elastically deformable. In some embodiments, the shaft may have a curved shape when the shaft is in a natural undeformed configuration. In some embodiments, the central portion may be devoid of any protrusions. In some embodiments, the shaft also may include a first tip positioned at the first end and configured to penetrate the prostatic tissue, and a second tip positioned at the second end and configured to penetrate the prostatic tissue. In some embodiments, the first locking tab and the second locking tab each may surround a circumference of the shaft. In some embodiments, the first protrusions or recesses and the second protrusions or recesses may include annular protrusions or recesses each extending around a circumference of the shaft. In some embodiments, the first protrusions or recesses and the second protrusions or recesses may include teeth positioned along a circumference of the shaft. In some embodiments, the implantable device also may include a balloon fixedly attached to the shaft at the first end or the second end. In some embodiments, the implantable device also may include an end tab fixedly attached to the shaft at the first end or the second end, with the end tab being elastically deformable or deflectable relative to the shaft.

According to another aspect, an implantable device for retracting prostatic tissue of a patient is provided. In one embodiment, the implantable device may include a shaft, a first locking tab movably attached to the shaft, and a second locking tab movably attached to the shaft. The shaft may have a first end and a second end disposed opposite one another. The shaft may include a central portion positioned between the first end and the second end, a first end portion extending from the central portion to the first end, and a second end portion extending from the central portion to the second end. The central portion may be configured to reside within a prostatic urethra of the patient. The first end portion may be configured to reside at least partially within first prostatic tissue of the patient. The first end portion may include a plurality of first protrusions or recesses. The second end portion may be configured to reside at least partially within second prostatic tissue of the patient. The second end portion may include a plurality of second protrusions or recesses. The first locking tab may be configured to reside within the prostatic urethra and to contact the first prostatic tissue. The second locking tab may be configured to reside within the prostatic urethra and to contact the second prostatic tissue. The first protrusions or recesses may be configured to allow the first locking tab to move along the first end portion toward the first end and to inhibit movement of the first locking tab along the first end portion toward the second end. The second protrusions or recesses may be configured to allow the second locking tab to move along the second end portion toward the second end and to inhibit movement of the second locking tab along the second end portion toward the first end.

In some embodiments, the shaft may be elastically deformable. In some embodiments, the shaft may have a curved shape when the shaft is in a natural undeformed configuration. In some embodiments, the central portion may be devoid of any protrusions. In some embodiments, the shaft also may include a first tip positioned at the first end and a second tip positioned at the second end, with the first tip being configured to penetrate the first prostatic tissue, and with the second tip being configured to penetrate the second prostatic tissue. In some embodiments, the first locking tab and the second locking tab each may surround a circumference of the shaft. In some embodiments, the first protrusions or recesses and the second protrusions or recesses may include annular protrusions or recesses each extending around a circumference of the shaft. In some embodiments, the first protrusions or recesses and the second protrusions or recesses may include teeth positioned along a circumference of the shaft. In some embodiments, the implantable device also may include a balloon fixedly attached to the shaft at the first end or the second end, with the balloon being configured to reside outside of a prostatic capsule of the patient. In some embodiments, the implantable device also may include an end tab fixedly attached to the shaft at the first end or the second end, with the end tab being elastically deformable or deflectable relative to the shaft, and with the end tab being configured to reside outside of a prostatic capsule of the patient.

According to another aspect, a method for retracting prostatic tissue of a patient is provided. In one embodiment, the method may include positioning a central portion of a shaft of an implantable device within a prostatic urethra of the patient, advancing a first end of the shaft into first prostatic tissue of the patient, advancing a second end of the shaft into second prostatic tissue of the patient, moving a first locking tab of the implantable device along a first end portion of the shaft toward the first end and into contact with the first prostatic tissue, and moving a second locking tab of the implantable device along a second end portion of the shaft toward the second end and into contact with the second prostatic tissue such that the first prostatic tissue and the second prostatic tissue are retracted.

In some embodiments, the first end portion may include a plurality of first protrusions or recesses configured to inhibit movement of the first locking tab toward the second end, and the second end portion may include a plurality of second protrusions or recesses configured to inhibit movement of the second locking tab toward the first end. In some embodiments, the first locking tab and the second locking tab may be moved simultaneously. In some embodiments, the second locking tab may be moved along the second end portion after the first locking tab is moved along the first end portion. In some embodiments, the first locking tab and the second locking tab may reside within the prostatic urethra in an implanted configuration. In some embodiments, the method also may include penetrating the first prostatic tissue with a first tip positioned at the first end and penetrating the second prostatic tissue with a second tip positioned at the second end. In some embodiments, the method also may include advancing the implantable device into the prostatic urethra while the shaft is in an elastically deformed configuration and allowing the shaft to move toward a natural undeformed configuration within the prostatic urethra. In some embodiments, the method also may include advancing the first end through the first prostatic tissue and outside of a prostatic capsule of the patient. In some embodiments, the method also may include expanding a balloon of the implantable device outside of the prostatic capsule. In some embodiments, the method also may include allowing an end tab of the implantable device to move toward a natural undeformed configuration outside of the prostatic capsule.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 8A is a schematic coronal view of an implantable device in accordance with one or more embodiments of the disclosure, showing the device implanted within prostatic tissue. FIG. 8B is a schematic partial cross-sectional view of the implantable device of FIG. 8A in accordance with one or more embodiments of the disclosure. FIG. 8C is a schematic partial cross-sectional view of the implantable device of FIG. 8A in accordance with one or more embodiments of the disclosure.

FIG. 12A is a schematic plan view of an implantable device in accordance with one or more embodiments of the disclosure. FIG. 12B is a schematic coronal view of the implantable device of FIG. 12A in accordance with one or more embodiments of the disclosure, showing the device positioned within prostatic tissue. FIG. 12C is a schematic coronal view of the implantable device of FIG. 12A in accordance with one or more embodiments of the disclosure, showing the device implanted within prostatic tissue.

Figure 1A:
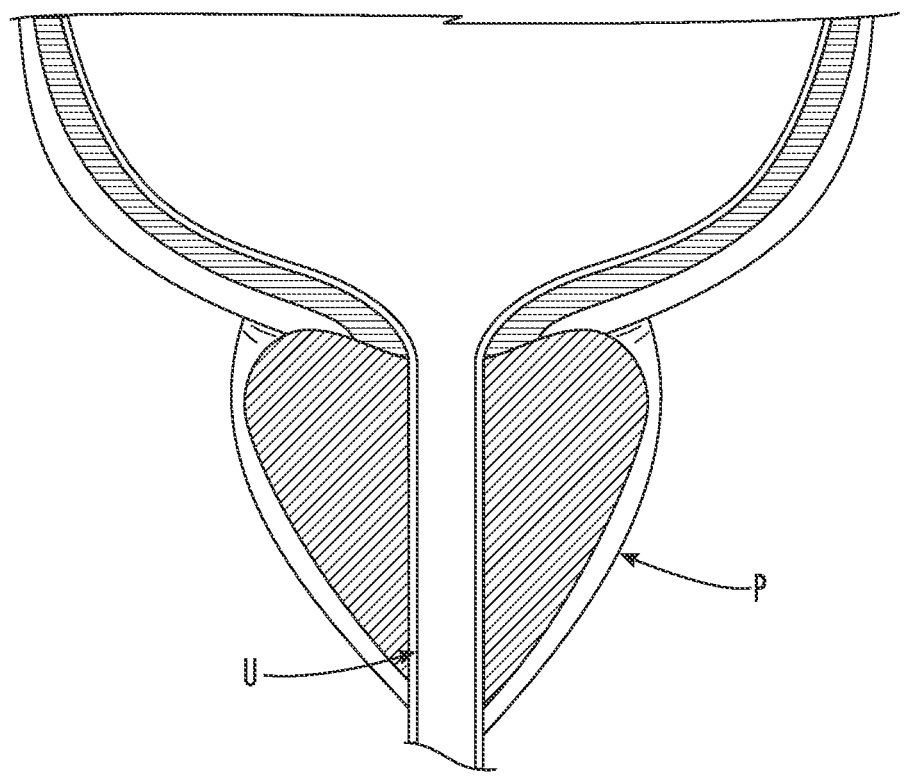
FIG. 1A is a coronal sectional view of the prostate of a patient having normal anatomy.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, and components have not been described in detail so as not to unnecessarily obscure aspects of the embodiments.

Overview

Figure 1B:
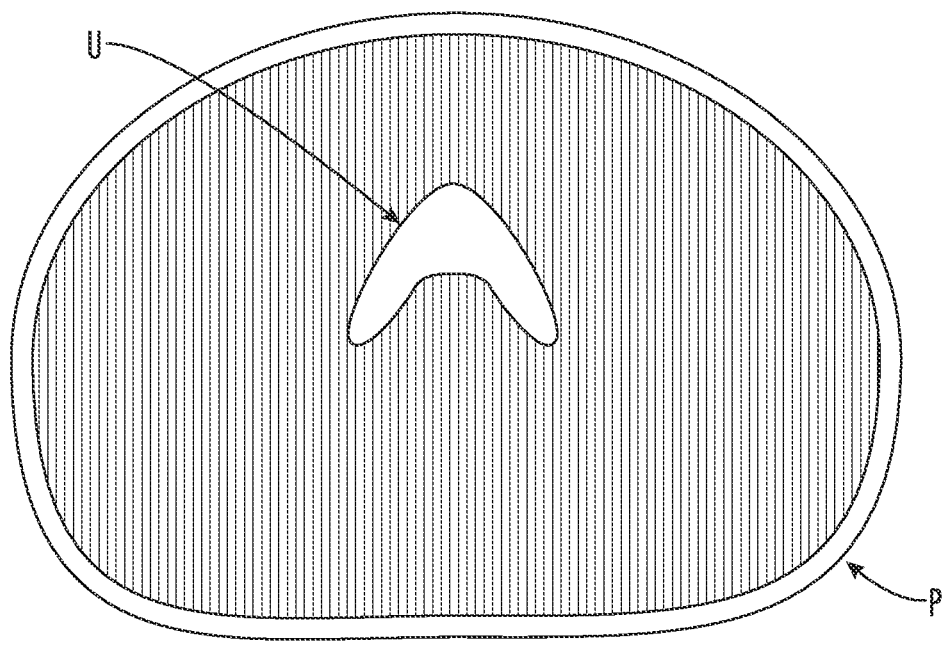
FIG. 1B is an axial sectional view of the prostate of a patient having normal anatomy.
Figure 1C:
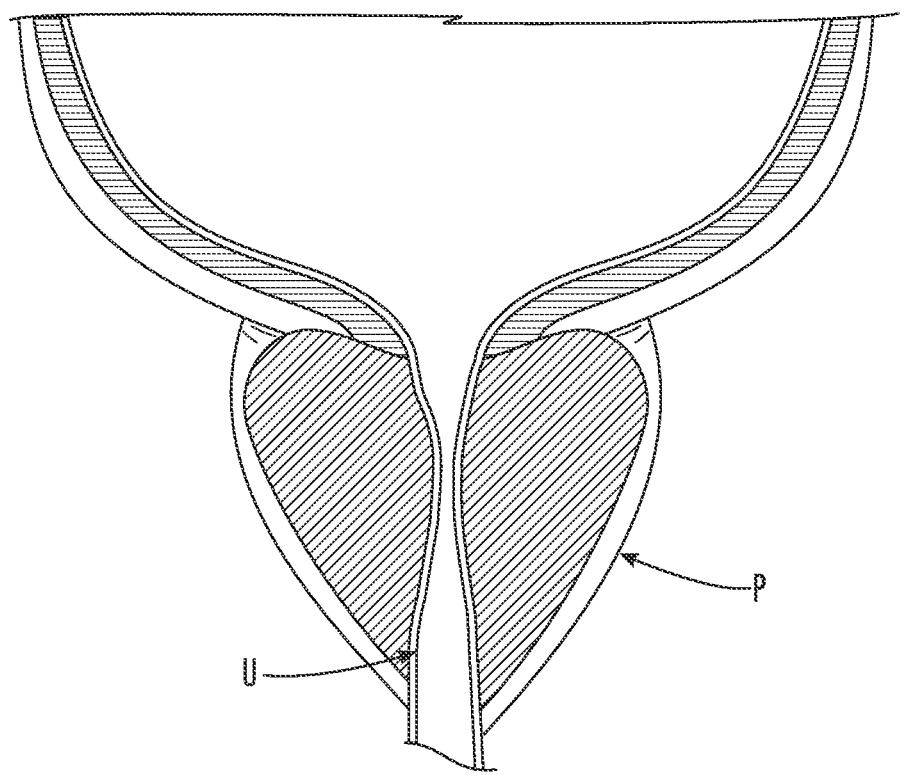
FIG. 1C is a coronal sectional view of the prostate of a patient having BPH.
Figure 1D:
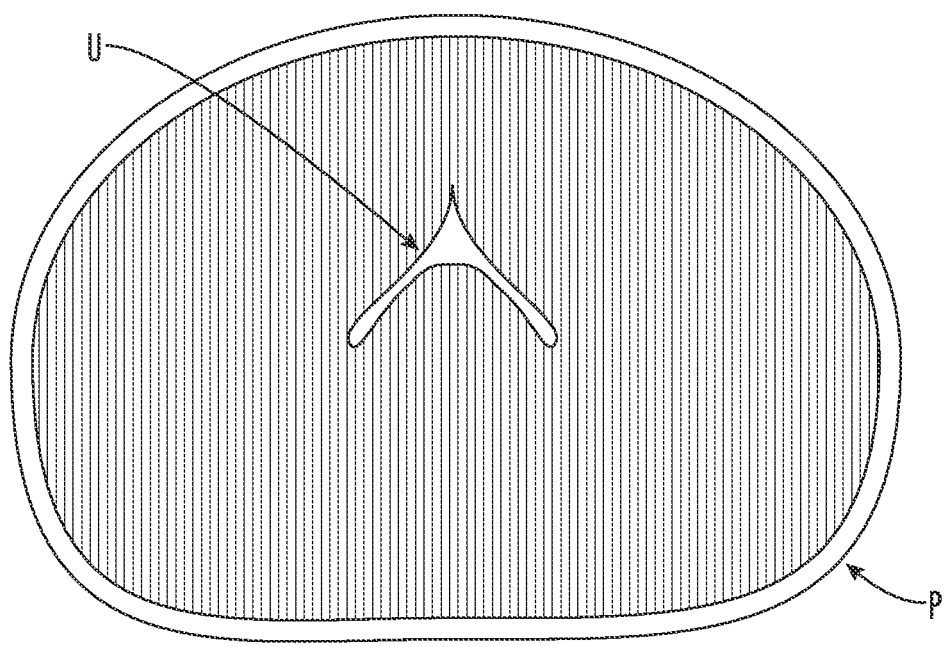
FIG. 1D is an axial sectional view of the prostate of a patient having BPH.

As discussed above, BPH is a non-cancerous enlargement of the prostate gland that causes an increasing stricture of the urethra as the prostate grows. FIGS. 1A and 1B illustrate the prostate P and the urethra U of a patient having normal anatomy. In contrast, FIGS. 1C and 1D illustrate the prostate P and the urethra U of a patient having BPH. As shown, BPH involves a narrowing of the urethra, which may result in LUTS such as frequent urination, urge incontinence, increased frequency of urination at night, and a weak stream with difficulty starting urination. Embodiments of implantable devices and methods for retracting prostatic tissue of a patient are provided herein. The implantable devices may be implanted in an outpatient setting, without the need for general anesthesia or an overnight hospital stay, and may provide rapid, effective, and durable relief from LUTS caused by BPH. Specifically, the implantable devices may be implanted in a minimally-invasive manner.

According to various embodiments described herein, the implantable devices may address one or more of the above-mentioned problems associated with existing devices and their use. For example, some embodiments of the implantable devices may be easily removable post-deployment, if needed. In some embodiments, the implantable devices may be capable of adjusting or dialing-in an appropriate level of tissue retraction to meet a patient's specific needs. In some embodiments, the implantable devices may be MR safe and may reduce the overall procedure time for implantation. In some embodiments, the implantable devices may be implanted with a reloadable delivery system that allows multiple implantable devices to be easily deployed during a procedure, thereby improving user experience and making the system more cost-effective.

As compared to existing devices for addressing LUTS caused by BPH, the implantable devices described herein may improve the ease, effectiveness, and economics of using the devices, making the devices more suitable for both developed and emerging economies, and potentially improving the clinical effect and durability of the therapy. Additionally, the tissue-sparing and removable attributes of the implantable devices would not preclude their use in patients that may continue with medical management or elect to have additional minimally-invasive or surgical BPH therapies at a later time. Ultimately, the implantable devices may provide faster, sustained relief of LUTS without the side-effects of drugs or surgical options. Still other benefits and advantages of the implantable devices provided herein over conventional devices and techniques will be appreciated by those of ordinary skill in the art from the following description and the appended drawings.

In some embodiments, an implantable device may be provided as a pre-assembled (i.e., not assembled in situ) balloon device for treatment of LUTS caused by BPH. The device may be positioned in the prostate as a complete, unexpanded system. Balloons of the device then may be filled with a fluid (e.g., gas or liquid) to expand the balloons for the purpose of: (i) securing the device in place, and/or (ii) retracting the prostatic tissue that is obscuring the urethra to improve urine flow. In some embodiments, the device may include a proximal balloon that is configured to reside in the urethra, a distal balloon that is configured to reside outside of the prostatic capsule, and an intermediate balloon that is configured to reside between the distal balloon and the proximal balloon. Various configurations, shapes, and biocompatible materials may be used for constructing the device. Example materials may include nitinol, PEEK, Pebax, stainless steel, and PTFE, although other biocompatible materials may be used. A tubular shaft and at least one fluid lumen may connect the balloons. After filling the balloons, the lumen(s) may be sealed by an elastomeric material or a mechanical crimp.

During implantation, an obturator or cannula may be used to create a channel in the prostate from the urethra to the prostatic capsule through which the device would be inserted and positioned in the unexpanded state. The obturator or cannula may be provided as a component of a device delivery system. The proximal balloon may be designed such that, when inflated, its diameter is large enough to prevent the balloon from entering the channel in the prostate, but such that the overall length or profile of the balloon is minimized to reduce any obstruction of the urethra lumen as much as possible. The intermediate balloon likewise may have a diameter that prevents it from entering the prostatic channel and may have a configuration and height such that, when filled, it expands lengthwise in the area between the prostatic capsule and the distal balloon, thus pulling the proximal balloon radially outward and retracting the prostate tissue. The distal balloon may be designed such that it minimizes any interaction with the tissue surrounding the prostate and is large and sturdy enough to interact properly with the intermediate balloon. The implantable device may be placed using a vascular interventional-style delivery system under visualization with a cystoscope. In some embodiments, the implantable device may be delivered through the working channel of the sheath used for the cystoscope. Alternatively, a specifically designed scope/sheath/delivery system may be used to deploy the device. In some embodiments, such a delivery system may have a scope channel built into it so that implantation could be visualized. With any delivery system, the scope and sheath may be advanced to the area of the prostatic urethra where the device is to be implanted to retract tissue. The obturator or cannula then may be advanced out of the tip of the delivery device and into the prostate, creating the channel in the prostate from the urethra to the prostate capsule into which the device is inserted. According to various embodiments, the balloon-style implantable device advantageously may provide the ability to adjust the expanded device to a patient's anatomy to create optimal tissue retraction, ease of implant removal post implantation, low metal content and MR safety attributes, and/or reloadability of the delivery system in situ (i.e., a new delivery system does not need to be placed for each implantable device in the case where multiple devices are to be implanted).

In some embodiments, an implantable device may be provided as a splint-like implant that spans the lumen of the urethra and compresses the prostate tissue to open the urethra lumen for treatment of LUTS secondary to BPH. The implantable device may include a slightly curved metal or polymer rod or shaft that is configured to extend from one side of the prostate, across the urethra lumen, and into the other side of the prostate tissue. A degree of the curvature may be optimized to limit occlusion of the urethra lumen and retraction of the prostate tissue. In some embodiments, the device may not extend outside of the prostatic capsule on either end. In other embodiments, the device may be configured to extend to or through the prostatic capsule and interact with the capsule using a balloon or other feature in order to secure the device in place on at least one side, as may be desired. To achieve the tissue retraction and open the urethra, the implantable device may include a pair of movable, locking tabs that are configured to interact with mating features of the rod. The locking tabs may be configured to be slid outward toward the respective ends of the rod until they achieve contact with the urethral lumen tissue and are adjusted to positions where the desired tissue retraction is achieved. The locking tabs may be capable of sliding only in the outward direction, as the mating features of the rod may inhibit movement of the locking tabs in the inward direction.

During implantation of such a locking-tab-style implantable device, a delivery system may be used to deploy the device as a complete, pre-assembled device. The two ends of the implant may be guided into the prostate tissue, and then the locking tabs may be slid into place along the rod, interacting with the mating features of the rod to keep the tabs in contact with the tissue and create the compressive forces to keep the urethra lumen open. For embodiments including a capsular balloon, the balloon may be filled with a fluid after the rod is placed into the prostate tissue. According to various embodiments, the locking-tab-style implantable device advantageously may provide the ability to adjust the expanded device to a patient's anatomy to create optimal tissue retraction at the time of initial implantation as well as at later revision procedures as desired. Additionally, the locking-tab-style implantable device may be particularly well suited for treating a prostate with an enlarged medial lobe, whereas current implantable devices are more suited to treating enlarged lateral lobes.

Further details, functionality, and advantages of various embodiments of implantable devices, such as balloon-style implantable devices, locking-tab-style implantable devices, movable-barb-style implantable devices, hydraulic-style implantable devices, deformable-style implantable devices, and jack-style implantable devices, and methods of implanting the same will be appreciated from the example devices depicted in the drawings and described below.

Example Implantable Devices and Methods

Figure 2A:
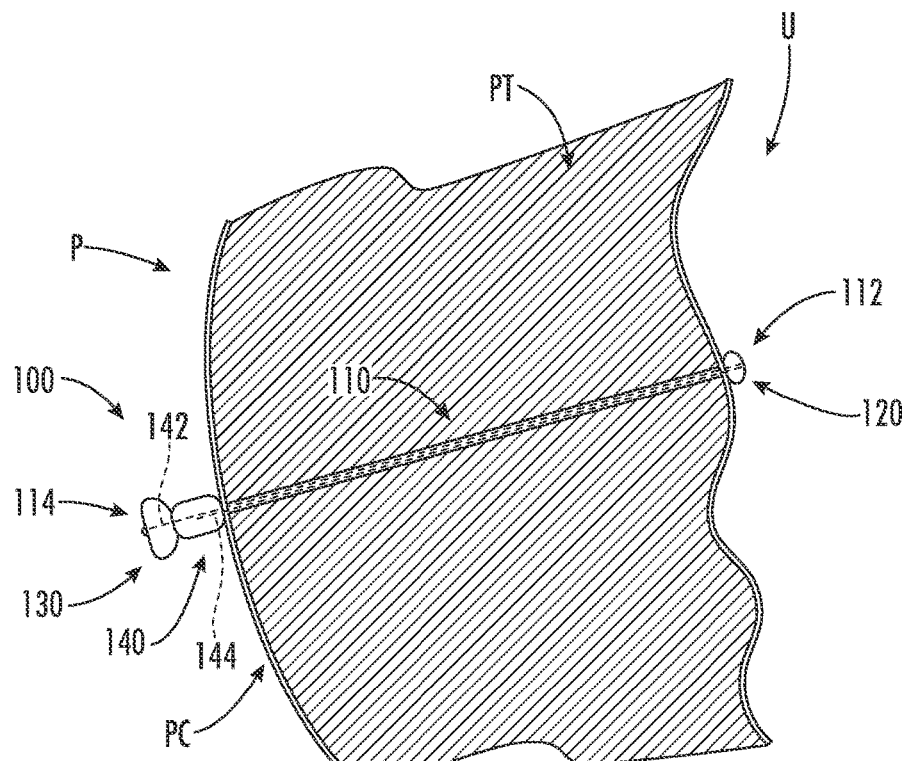
FIG. 2A is a schematic coronal view of an implantable device in accordance with one or more embodiments of the disclosure, showing the device implanted within prostatic tissue.

Referring now to FIG. 2A, an example implantable device 100 (which also may be referred to as a "prostatic tissue retractor," a "tissue retractor," or simply a "device") is depicted. The implantable device 100 is configured for retracting prostatic tissue PT of a patient to treat LUTS caused by BPH. In some embodiments, the device 100 may be implanted in a minimally-invasive manner. An example placement of the implantable device 100 is depicted in FIG. 2A. In some embodiments, multiple devices 100 may be used for a single patient.

The implantable device 100 generally may include a shaft 110 and a plurality of balloons. For example, the device 100 may include a proximal balloon 120, a distal balloon 130, and an intermediate balloon 140, as shown in FIG. 2A. The shaft 110 may have a proximal end 112 and a distal end 114 disposed opposite one another in a direction of a longitudinal axis of the shaft 110. In some embodiments, the shaft 110 may be formed of a flexible material and at least a portion of the shaft 110 may be configured to be elastically deformed from a natural undeformed configuration to a deformed configuration. Example materials may include nitinol, PEEK, Pebax, stainless steel, and PTFE, although other biocompatible materials may be used. In some embodiments, the shaft 110 may have a linear shape when the shaft 110 is in the natural undeformed configuration. In some embodiments, the shaft 110 may have a curved or otherwise contoured shape when the shaft 110 is in the natural undeformed configuration. As shown, the shaft 110 may be configured to extend through prostatic tissue PT of the patient.

The proximal balloon 120 may be fixedly attached to the shaft 110 and positioned closer to the proximal end 112 than the distal end 114. In some embodiments, the proximal balloon 120 may be positioned at the proximal end 112 of the shaft 110. The proximal balloon 120 may be configured to reside within the prostatic urethra U of the patient. In some embodiments, as shown, the proximal balloon 120 may be configured to contact the wall of the prostatic urethra U when the device 100 is in an implanted state. The proximal balloon 120 may be expandable from an unexpanded configuration to an expanded configuration, for example, by filling a reservoir of the proximal balloon 120 with a fluid.

The distal balloon 130 may be fixedly attached to the shaft 110 and positioned closer to the distal end 114 than the proximal end 112. In some embodiments, the distal balloon 130 may be positioned at the distal end 114 of the shaft 110. The distal balloon 130 may be configured to reside outside of the prostatic capsule PC of the patient. The distal balloon 130 may be expandable from an unexpanded configuration to an expanded configuration, for example, by filling a reservoir of the distal balloon 130 with a fluid.

The intermediate balloon 140 may be fixedly attached to the shaft and positioned between the proximal balloon 120 and the distal balloon 130. In some embodiments, as shown, the intermediate balloon 140 may be positioned closer to the distal balloon 130 than the proximal balloon 120. In some embodiments, the intermediate balloon 140 may be positioned adjacent to the distal balloon 130. The intermediate balloon 140 may be configured to reside outside of the prostatic capsule PC of the patient. In some embodiments, as shown, the intermediate balloon 140 may be configured to contact the prostatic capsule PC when the device 100 is in an implanted state. The intermediate balloon 140 may be expandable from an unexpanded configuration to an expanded configuration, for example, by filling a reservoir of the intermediate balloon 140 with a fluid.

The shaft 110 may include a plurality of lumens configured to facilitate expansion of the balloons 120, 130, 140. In some embodiments, the shaft 110 may include a first lumen 142 and a second lumen 144. The first lumen 142 may be in fluid communication with the reservoir of the proximal balloon 120 and the reservoir of the distal balloon 130 and in fluid isolation from the reservoir of the intermediate balloon 140. In this manner, the proximal balloon 120 and the distal balloon 130 may be expanded simultaneously while the configuration of the intermediate balloon 140 is unchanged. The second lumen 144 may be in fluid communication with the reservoir of the intermediate balloon 140 and in fluid isolation from the reservoir of the proximal balloon 120 and the reservoir of the distal balloon 130. In this manner, the intermediate balloon 140 may be expanded while the configurations of the proximal balloon 120 and the distal balloon 130 are unchanged.

The shaft 110 may have an outer diameter in a direction perpendicular to the longitudinal axis of the shaft 110. In some embodiments, the diameter of the shaft 110 may be constant along the length thereof. When in its expanded configuration, the proximal balloon 120 may have an outer diameter (in the direction perpendicular to the longitudinal axis) that is greater than the diameter of the shaft 110. In this manner, after insertion of the shaft 110 through a channel formed in prostatic tissue PT, the proximal balloon 120 may be expanded to inhibit the balloon 120 from entering the channel, thereby securing placement of the device 100. In some embodiments, the proximal balloon 120 may have a length in the direction of the longitudinal axis when the proximal balloon 120 is in the expanded configuration, and the diameter of the balloon 120 may be greater than the length. In this manner, the obstruction of the urethra lumen by the proximal balloon 120 may be minimized. Similarly, when in its expanded configuration, the distal balloon 130 may have an outer diameter (in the direction perpendicular to the longitudinal axis) that is greater than the diameter of the shaft 110. In this manner, after insertion of the shaft 110 through the channel, the distal balloon 130 may be expanded to inhibit the balloon 130 from entering the channel, thereby securing placement of the device 100. In some embodiments, the distal balloon 130 may have a length in the direction of the longitudinal axis when the distal balloon 130 is in the expanded configuration, and the diameter of the balloon 130 may be greater than the length. In this manner, the interaction between the distal balloon 130 and tissue surrounding the prostate P may be minimized.

When in its expanded configuration, the intermediate balloon 140 may have an outer diameter (in the direction perpendicular to the longitudinal axis) that is greater than the diameter of the shaft 110. In this manner, the expanded configuration of the intermediate balloon 140 also may inhibit the balloon 140 form entering the channel. In some embodiments, the intermediate balloon 140 may have a length in the direction of the longitudinal axis when the intermediate balloon 140 is in the expanded configuration, and the diameter of the balloon 140 may be less than the length. As discussed further below, expansion of the intermediate balloon 140 may cause retraction of the prostatic tissue PT disposed between the intermediate balloon 140 and the proximal balloon 120. In some embodiments, a degree of expansion of the intermediate balloon 140 may correspond to a degree of retraction of the prostatic tissue PT. In other words, greater expansion of the intermediate balloon 140 may be used to provide greater retraction of the prostatic tissue PT. In this manner, by selectively expanding the intermediate balloon 140, the degree of retraction of the prostatic tissue PT may be adjusted to suit the anatomy of a particular patient.

Figure 2B:
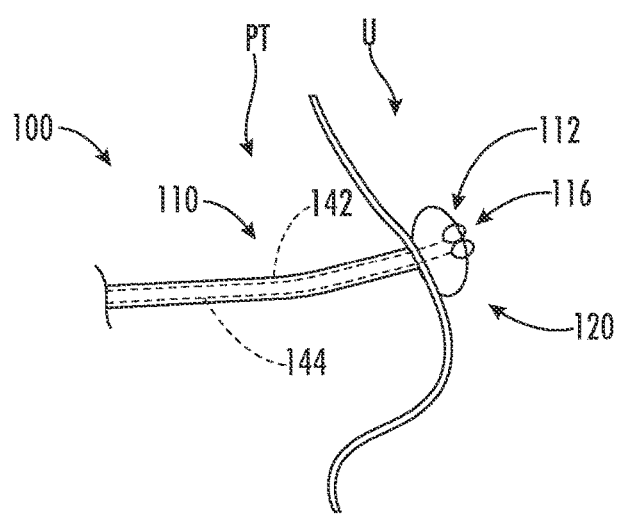
FIG. 2B is a schematic coronal view of a proximal portion of the implantable device of FIG. 2A in accordance with one or more embodiments of the disclosure.
Figure 2C:
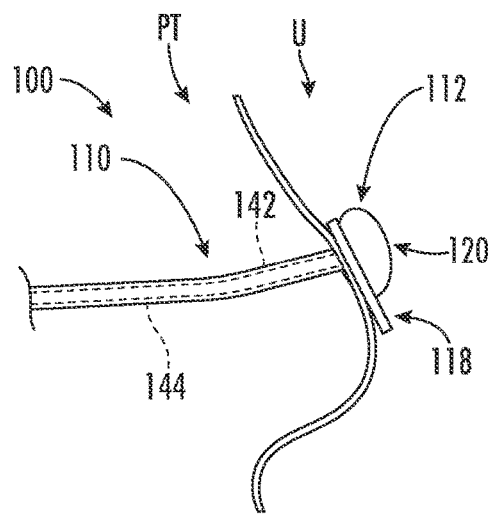
FIG. 2C is a schematic coronal view of a proximal portion of the implantable device of FIG. 2A in accordance with one or more embodiments of the disclosure.

After the balloons 120, 130, 140 are expanded, the lumens 142, 144 of the device 100 may be sealed such that the balloons 120, 130, 140 are maintained in their respective expanded configurations. In some embodiments, the device 100 may include one or more self-sealing ports 116 for sealing the respective ends of the lumens 142, 144, as shown in FIG. 2B. The self-sealing ports 116 may be provided at or near the proximal end 112 of the device 100. In some embodiments, a first self-sealing port 116 may be provided for the first lumen 142, and a second self-sealing port 116 may be provided for the second lumen 144. Each self-sealing port 116 may include an elastomeric member that is configured to be moved between an open configuration for filling the balloons 120, 130, 140 via the respective lumens 142, 144 and a closed configuration for sealing the lumens 142, 144 to maintain the balloons 120, 130, 140 in their expanded configurations. For example, the elastomeric members may be formed as one-way valves. In other embodiments, the lumens 142, 144 of the device 100 may be sealed by a mechanical crimp 118, as shown in FIG. 2C, such that the balloons 120, 130, 140 are maintained in their respective expanded configurations. Various other means for sealing the lumens 142, 144 of the device 100 and maintaining the balloons 120, 130, 140 in their expanded configurations may be used in other embodiments. In some embodiments, the proximal balloon 120 may be omitted, and securement of the device 100 at its proximal end may be provided by a flange, tab or similar structure, or the self-sealing ports 116 that are used for expanding the balloons 130, 140.

Figure 3A:
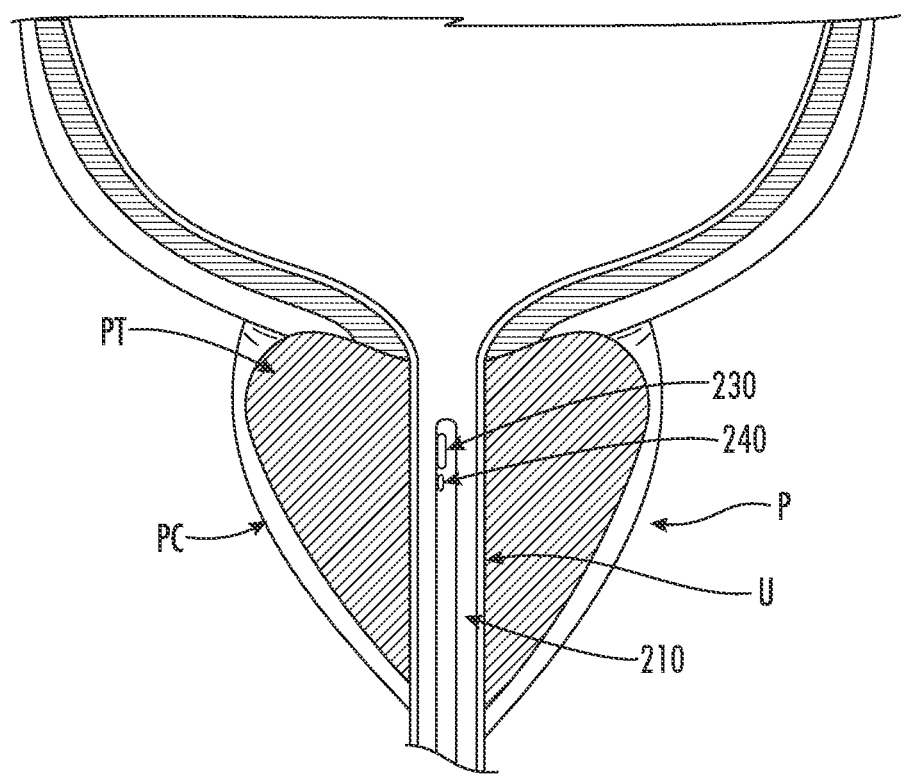
FIGS. 3A-3E are schematic coronal views illustrating implantation of the implantable device of FIG. 2A within prostatic tissue in accordance with one or more embodiments of the disclosure.
Figure 3B:
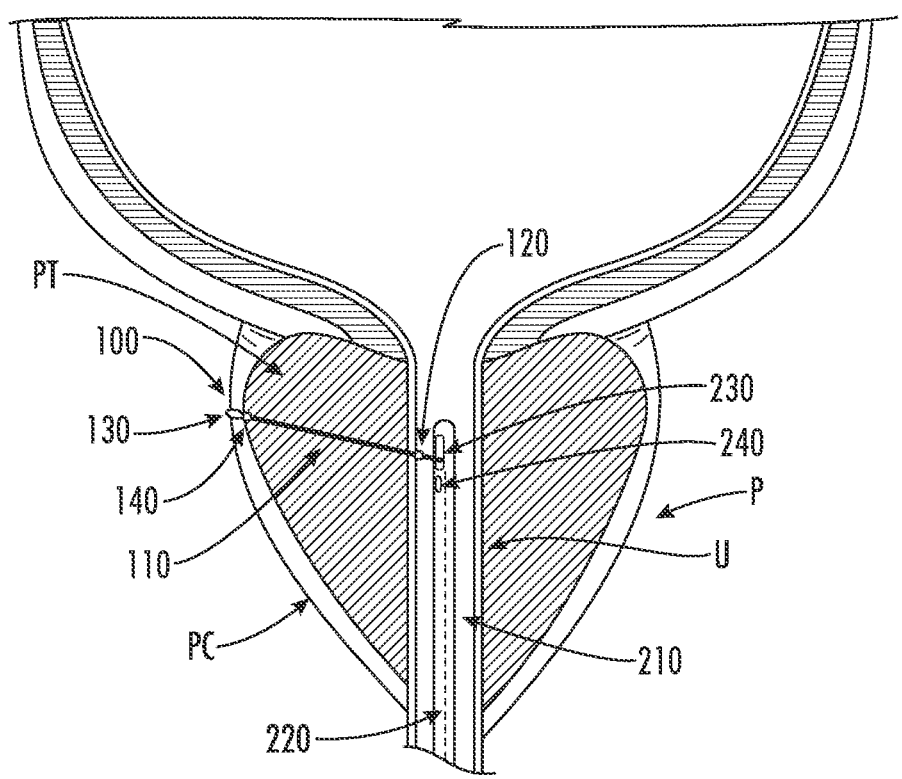
Figure 3C:
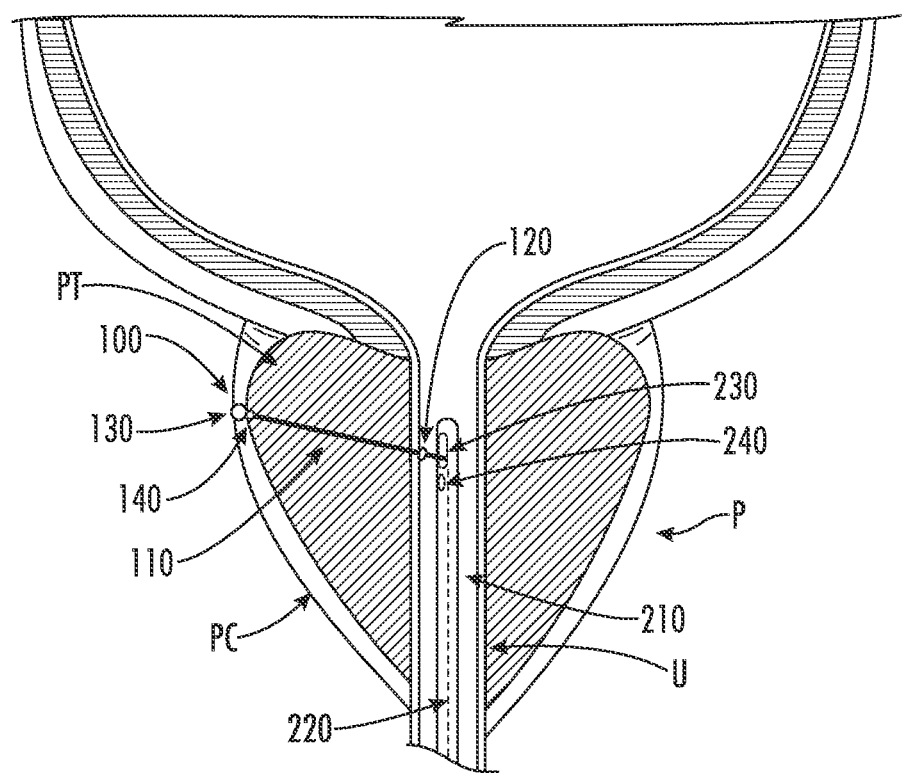
Figure 3D:
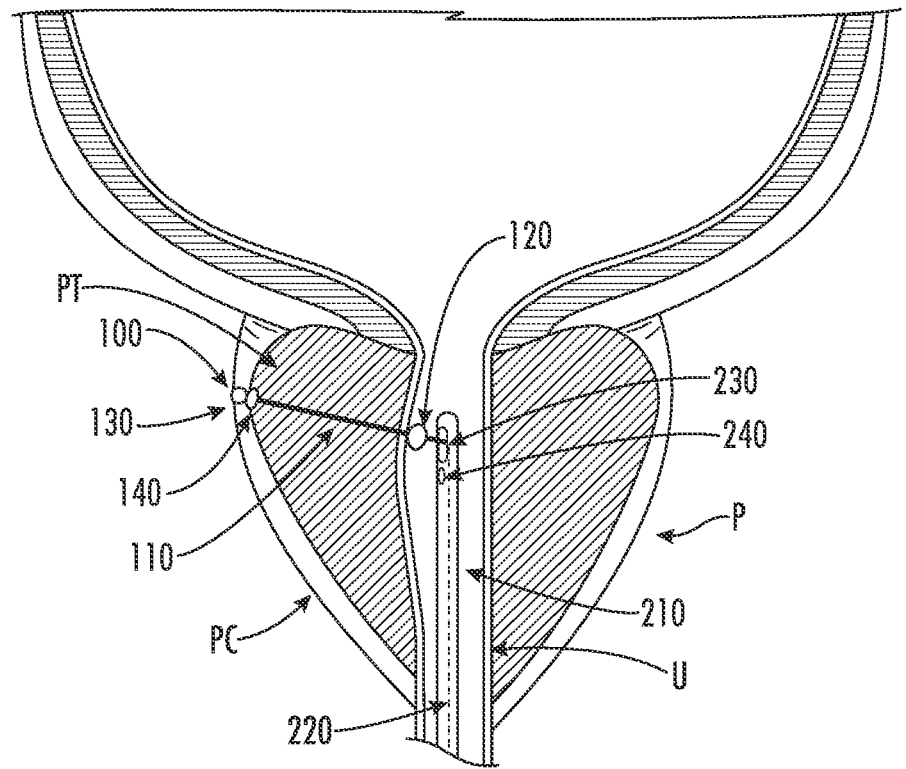
Figure 3E:
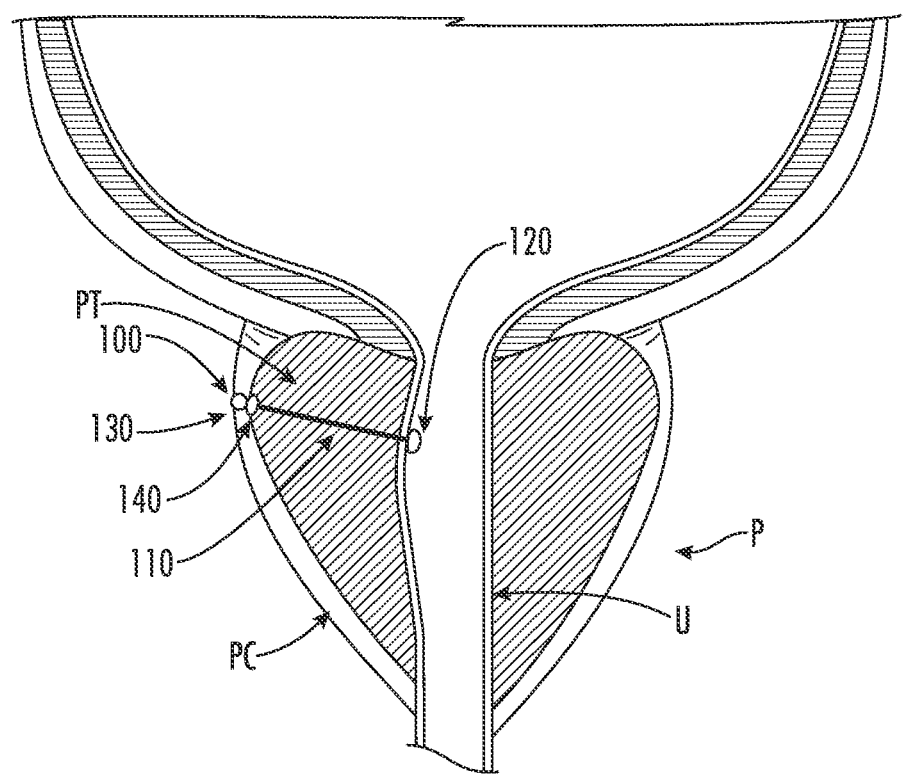

FIGS. 3A-3E illustrate example methods of implanting the implantable device 100 to retract prostatic tissue PT of a patient. The device 100 may be implanted using a delivery system under visualization with a cystoscope, as described above. As shown in FIG. 3A, a sheath 210 may be inserted through the urethra U of the patient and positioned about the prostate P. The implantable device 100 may be passed through the sheath 210, via a working lumen 230 of the sheath 210, along with other components of the delivery system to facilitate positioning and deployment of the device 100 under visualization through a cystoscope lumen 240 of the sheath 210. In some embodiments, an obturator or cannula 220 may be used to form a channel through prostatic tissue PT of the patient, with the channel extending from the prostatic urethra U to the prostatic capsule PC of the patient. In other embodiments, the device 100 may be passed through the prostatic tissue PT without first forming a channel. The device 100 may be positioned such that the device 100 extends from the prostatic urethra U to the prostatic capsule PC, as shown in FIG. 3B. In some embodiments, as shown, the shaft 110 may be positioned within the prostatic tissue PT, the proximal balloon 120 may be positioned within the prostatic urethra U, and the distal balloon 130 and the intermediate balloon 140 may be positioned outside of the prostatic capsule PC. The distal balloon 130 and the intermediate balloon 140 may be passed through the prostatic tissue PT while the distal balloon 130 is in its collapsed configuration and the intermediate balloon 140 is in its collapsed configuration. The proximal balloon 120 also may be in its collapsed configuration while the device 100 is passed through the prostatic tissue PT. In some embodiments, the device 100 may be positioned within the cannula 220 such that the device 100 is passed through the prostatic tissue PT while the cannula 220 forms the channel, and then the cannula 220 may be retracted such that the device 100 is deployed in the prostatic tissue PT. In some embodiments, the obturator or cannula 220 may not be used to form the channel, and the device 100 may be passed directly into the prostatic tissue PT and positioned in the prostate P. After positioning the device 100, the proximal balloon 120 and the distal balloon 130 may be expanded, as shown in FIG. 3C. As described above, expansion of the proximal balloon 120 and the distal balloon 130 may secure the device 100 relative to the prostatic tissue PT. As shown, the proximal balloon 120 and the distal balloon 130 may be expanded while the intermediate balloon 140 is maintained in its collapsed configuration. In some embodiments, the proximal balloon 120 and the distal balloon 130 may be expanded simultaneously, for example, via a common lumen. After expansion of the proximal balloon 120 and the distal balloon 130, the intermediate balloon 140 may be expanded, as shown in FIG. 3D. FIG. 3E shows the device 100 in an implanted state, after removal of the delivery system. As shown, the expansion of the intermediate balloon 140 may cause the prostatic tissue PT to be compressed between the proximal balloon 120 and the intermediate balloon 140. Thus, the implantable device 100 may retract the prostatic tissue PT of the patient to address LUTS caused by BPH. In some embodiments, a single device 100 may be used. In other embodiments, multiple devices 100 may be implanted within different portions of prostatic tissue PT of a patient.

Figure 4:
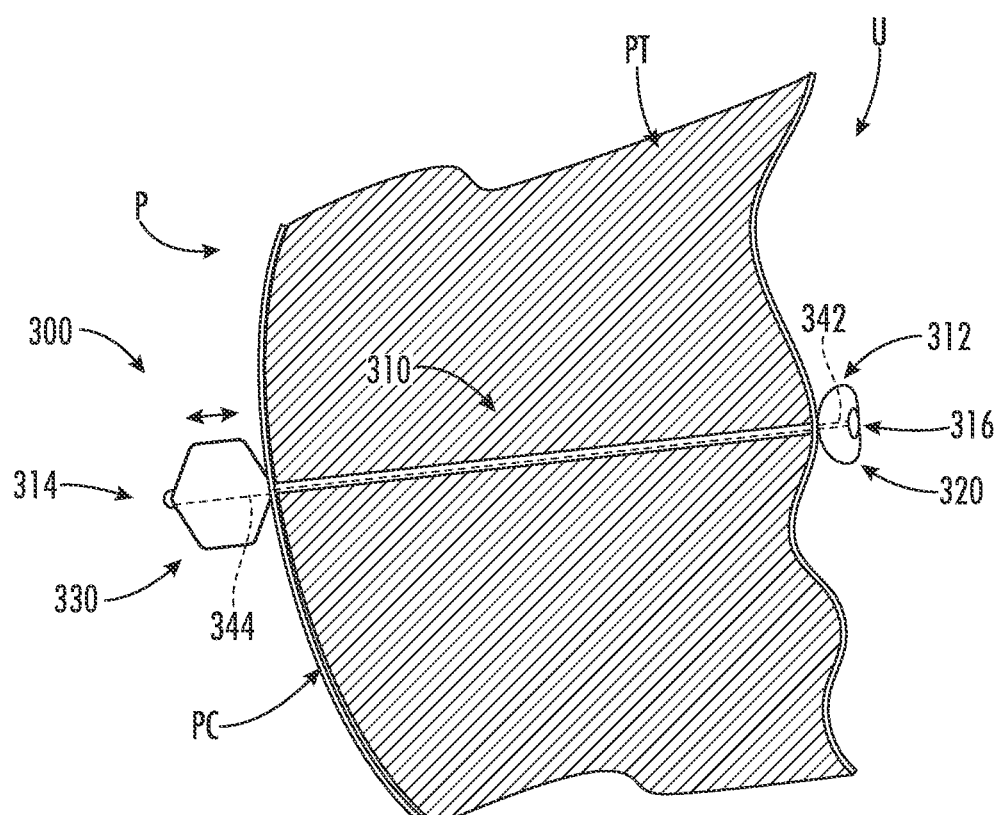
FIG. 4 is a schematic coronal view of an implantable device in accordance with one or more embodiments of the disclosure, showing the device implanted within prostatic tissue.

FIG. 4 illustrates another example implantable device 300 (which also may be referred to as a "prostatic tissue retractor," a "tissue retractor," or simply a "device") having a balloon-style configuration. The implantable device 300 generally may be configured in a manner similar to the implantable device 100 described above. In FIG. 4, corresponding features are identified using corresponding reference numbers. As shown, the device 300 may include a shaft 310 having a proximal end 312 and a distal end 314, a self-sealing port 316, a proximal balloon 320, and a distal balloon 330. As compared to the device 100, the device 300 may not include an intermediate balloon. Instead, the distal balloon 330 may perform the functions of both initially securing the device 300 relative to the prostatic tissue PT and retracting the prostatic tissue PT. The distal balloon 330 may be configured to expand radially and longitudinally with respect to the shaft 310. In some embodiments, the distal balloon 330 may be configured to expand radially and then to expand longitudinally. In this manner, radial expansion of the distal balloon 330 may inhibit the balloon 330 from entering the channel formed in the prostatic tissue PT, thereby securing the device 300, while longitudinal expansion of the distal balloon 330 may cause the prostatic tissue PT disposed between the proximal balloon 320 and the distal balloon 330 to be compressed. In some embodiments, the device 300 may include a first lumen 342 that is in fluid communication with the reservoir of the proximal balloon 320 and in fluid isolation from the reservoir of the distal balloon 330, and a second lumen 344 that is in fluid communication with the reservoir of the distal balloon 330 and in fluid isolation from the reservoir of the proximal balloon 320. In this manner, the balloons 320, 330 may be separately expanded, and a degree of expansion of the distal balloon 330 may be adjusted to accommodate the anatomy of a particular patient. In some embodiments, the proximal balloon 320 may be omitted, and securement of the device 300 at its proximal end may be provided by a flange, tab or similar structure, or the self-sealing port 316 that is used for expanding the distal balloon 330.

The implantable device 300 may be implanted using a method similar to that described above with respect to the implantable device 100. For example, an obturator or cannula may be used to form a channel through prostatic tissue PT of the patient, and the device 300 may be passed through the channel such that the device 300 extends from the prostatic urethra U to the prostatic capsule PC. The shaft 310 may be positioned within the channel, the proximal balloon 320 may be positioned within the prostatic urethra U, and the distal balloon 330 may be positioned outside of the prostatic capsule PC. In some embodiments, the obturator or cannula may not be used, and the device 300 may be passed directly into the prostatic tissue PT and positioned. After positioning of the device 300, the proximal balloon 320 may be expanded to inhibit distal movement of the device 300 relative to the prostatic tissue PT. Then, the distal balloon 330 may be expanded to secure the device 300 relative to the prostatic tissue PT and to cause the prostatic tissue PT to be compressed between the proximal balloon 320 and the distal balloon 330. Thus, the implantable device 300 may retract the prostatic tissue PT of the patient to address LUTS caused by BPH. In some embodiments, a single device 300 may be used. In other embodiments, multiple devices 300 may be implanted within different portions of prostatic tissue PT of a patient.

Figure 5A:
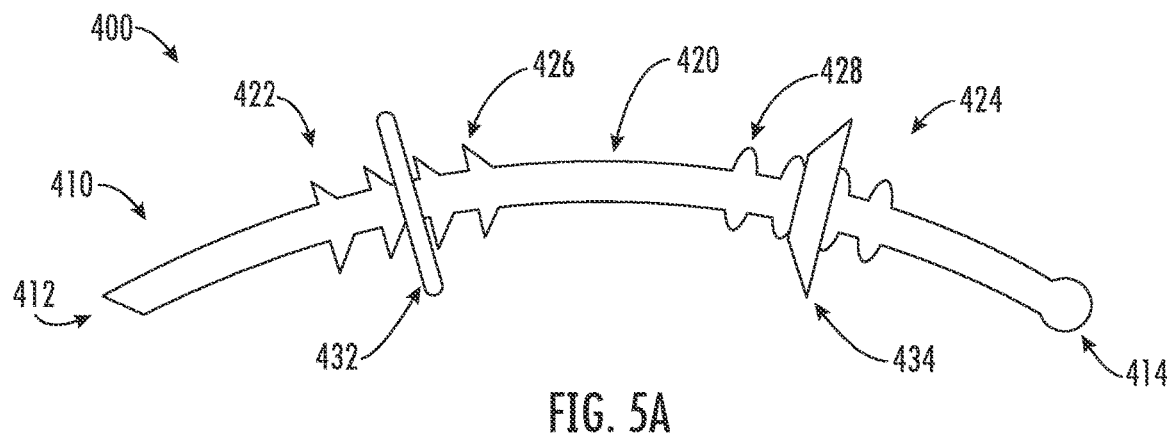
FIG. 5A is a schematic side view of an implantable device in accordance with one or more embodiments of the disclosure.
Figure 5B:
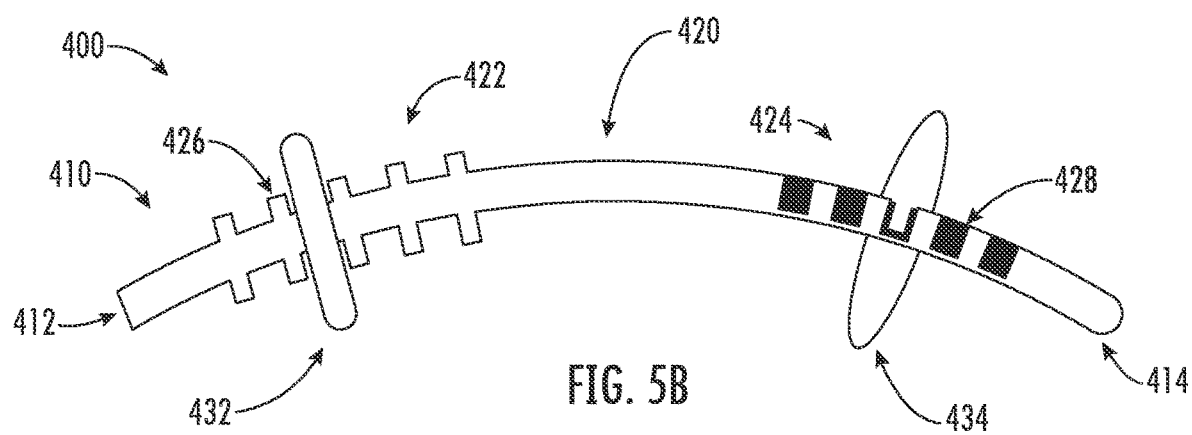
FIG. 5B is a schematic side view of an implantable device in accordance with one or more embodiments of the disclosure.

Referring now to FIGS. 5A and 5B, an example implantable device 400 (which also may be referred to as a "prostatic tissue retractor," a "tissue retractor," or simply a "device") is depicted. The implantable device 400 is configured for retracting prostatic tissue PT of a patient to treat LUTS caused by BPH. In some embodiments, the device 400 may be implanted in a minimally-invasive manner. An example placement of the implantable device 400 is depicted in FIGS. 6E and 6F. In some embodiments, multiple devices 400 may be used for a single patient, as shown in FIG. 6F.

The implantable device 400 generally may include a shaft 410 and a plurality of locking tabs. For example, the device 400 may include a first locking tab 432 that is movably attached to the shaft 410 and a second locking tab 434 that is movably attached to the shaft 410. The shaft 410 may have a first end 412 and a second end 414 disposed opposite one another in a direction of a longitudinal axis of the shaft 410. In some embodiments, the shaft 410 may be formed of a flexible material and at least a portion of the shaft 410 may be configured to be elastically deformed from a natural undeformed configuration to a deformed configuration. Example materials may include nitinol, PEEK, Pebax, stainless steel, and PTFE, although other biocompatible materials may be used. In some embodiments, the shaft 410 may have a curved shape when the shaft 410 is in the natural undeformed configuration. In other embodiments, the shaft 410 may have an otherwise contoured shape or may have a linear shape when the shaft 410 is in the natural undeformed configuration. In some embodiments, shaft 410 may have a circular cross-sectional shape. In other embodiments, shaft 410 may have a non-circular cross-sectional shape (e.g., triangular, hexagonal, flat).

As shown, the shaft 410 may include a central portion 420 positioned between the first end 412 and the second end 414, a first end portion 422 extending from the central portion 420 to the first end 412, and a second end portion 424 extending from the central portion 420 to the second end 414. The central portion 420 may be configured to reside within the prostatic urethra U of the patient. The first end portion 422 may be configured to reside at least partially within first prostatic tissue PT of the patient, while the second end portion 424 may be configured to reside at least partially within second prostatic tissue PT of the patient disposed opposite the first prostatic tissue PT. The first end portion 422 may include a plurality of first protrusions or recesses 426 configured for engaging the first locking tab 432. Similarly, the second end portion 424 may include a plurality of second protrusions or recesses 428 configured for engaging the second locking tab 434. In some embodiments, the first protrusions or recesses 426 and the second protrusions or recesses 428 may include annular protrusions each extending around a circumference of the shaft 410. In some embodiments, the first protrusions or recesses 426 and the second protrusions or recesses 428 may include annular recesses each extending around a circumference of the shaft 410. In some embodiments, the first protrusions or recesses 426 and the second protrusions or recesses 428 may include teeth positioned along a circumference of the shaft 410. The central portion 420 may be devoid of any protrusions or recesses. In some embodiments, the shaft 410 may include a first tip positioned at the first end 412 and configured to pierce the first prostatic tissue PT, and a second tip positioned at the second end 414 and configured to pierce the second prostatic tissue PT. Various tip configurations for the first end 412 and the second end 414 may be used, including sharpened tips, blunt tips, square tips, rounded tips, or atraumatic tips.

The first locking tab 432 may be configured to reside within the prostatic urethra U and to contact the first prostatic tissue PT. In a similar manner, the second locking tab 434 may be configured to reside within the prostatic urethra U and to contact the second prostatic tissue PT. The first protrusions or recesses 426 may be configured to allow the first locking tab 432 to move along the first end portion 422 toward the first end 412 and to inhibit movement of the first locking tab 432 along the first end portion 422 toward the second end 414. In this manner, the engagement between the first locking tab 432 and the first protrusions or recesses 426 may provide a mechanism for one-way movement of the first locking tab 432 toward the first end 412. The second protrusions or recesses 428 may be configured to allow the second locking tab 434 to move along the second end portion 424 toward the second end 414 and to inhibit movement of the second locking tab 434 along the second end portion 424 toward the first end 412. In this manner, the engagement between the second locking tab 434 and the second protrusions or recesses 428 may provide a mechanism for one-way movement of the second locking tab 434 toward the second end 414. In some embodiments, the first locking tab 432 and the second locking tab 434 each may surround a circumference of the shaft 410. Various shapes and configurations of the first protrusions or recesses 426, the second protrusions or recesses 428, and the locking tabs 432, 434 may be used.

Figure 6A:
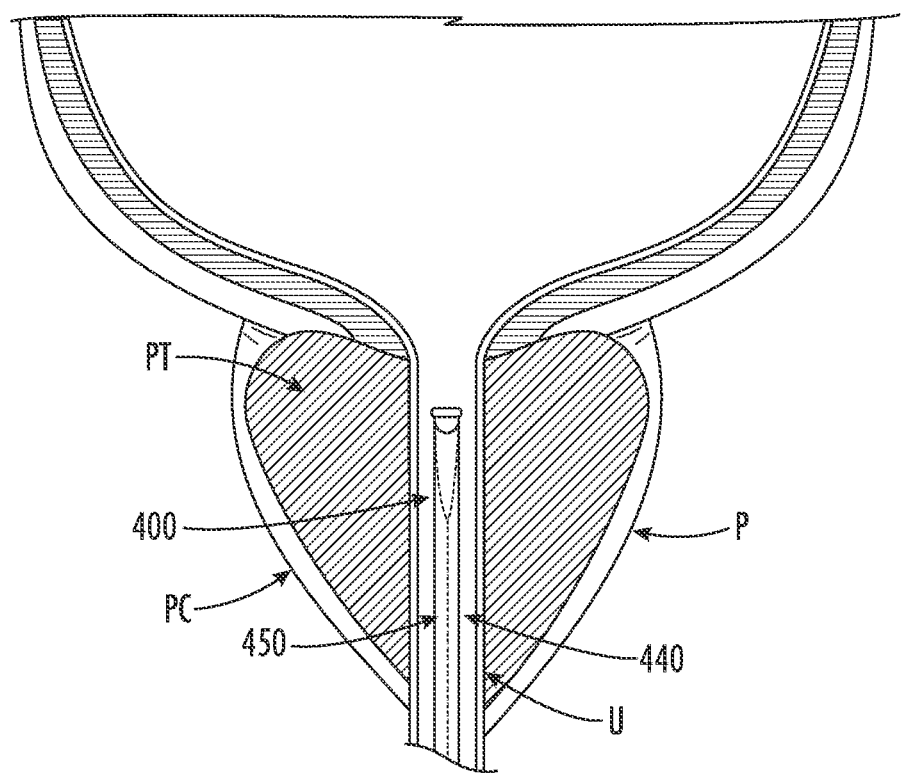
FIGS. 6A-6E are schematic coronal views illustrating implantation of an implantable device within prostatic tissue in accordance with one or more embodiments of the disclosure.
Figure 6B:
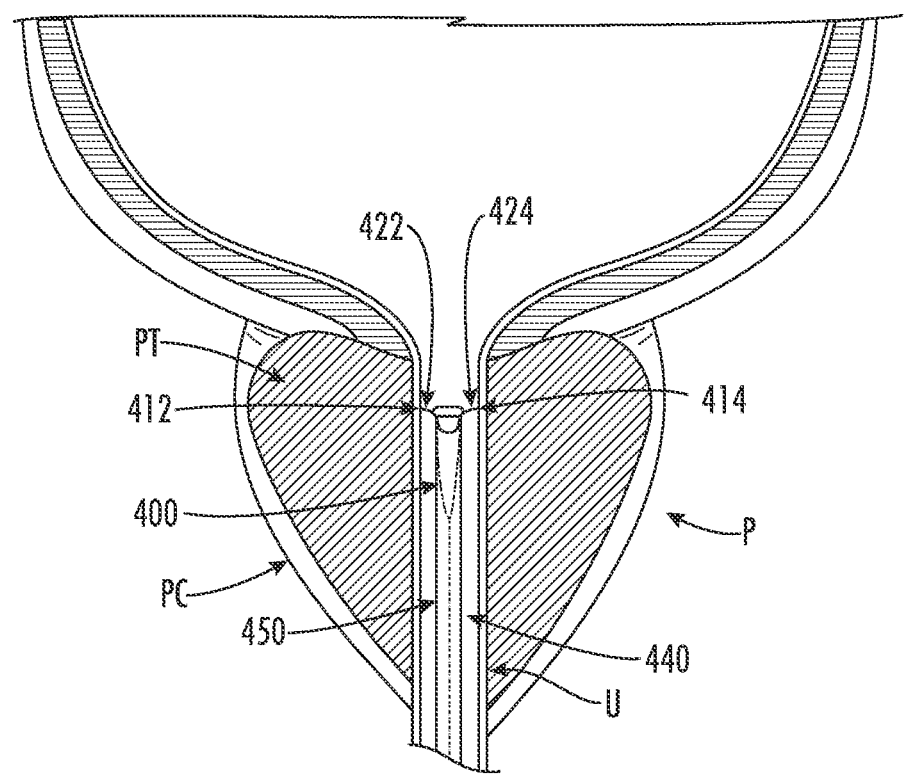
Figure 6C:
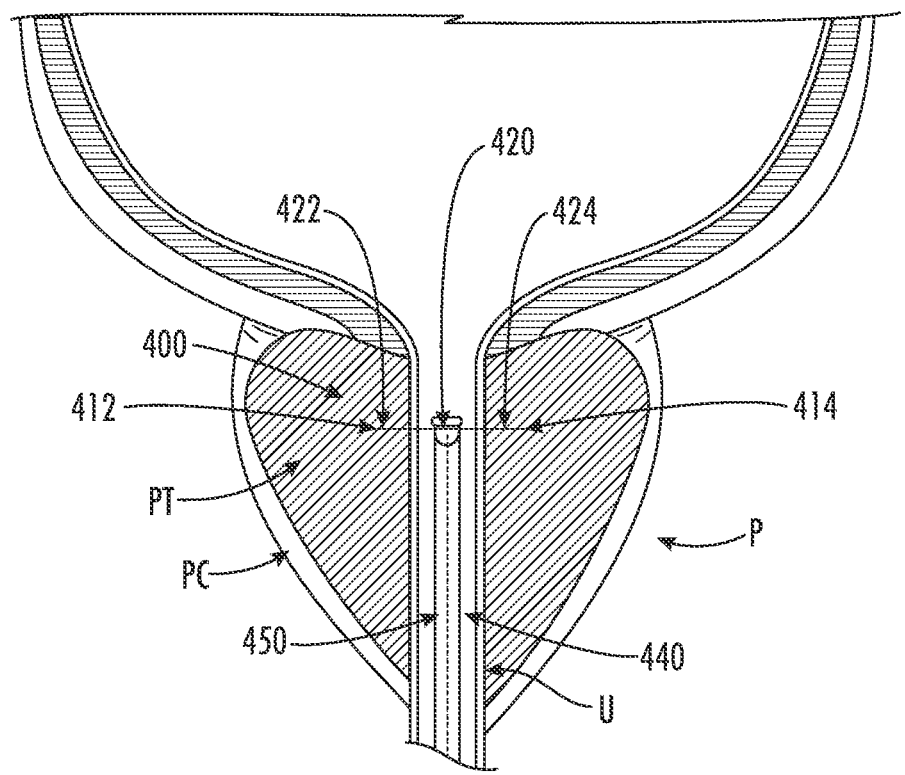
Figure 6D:
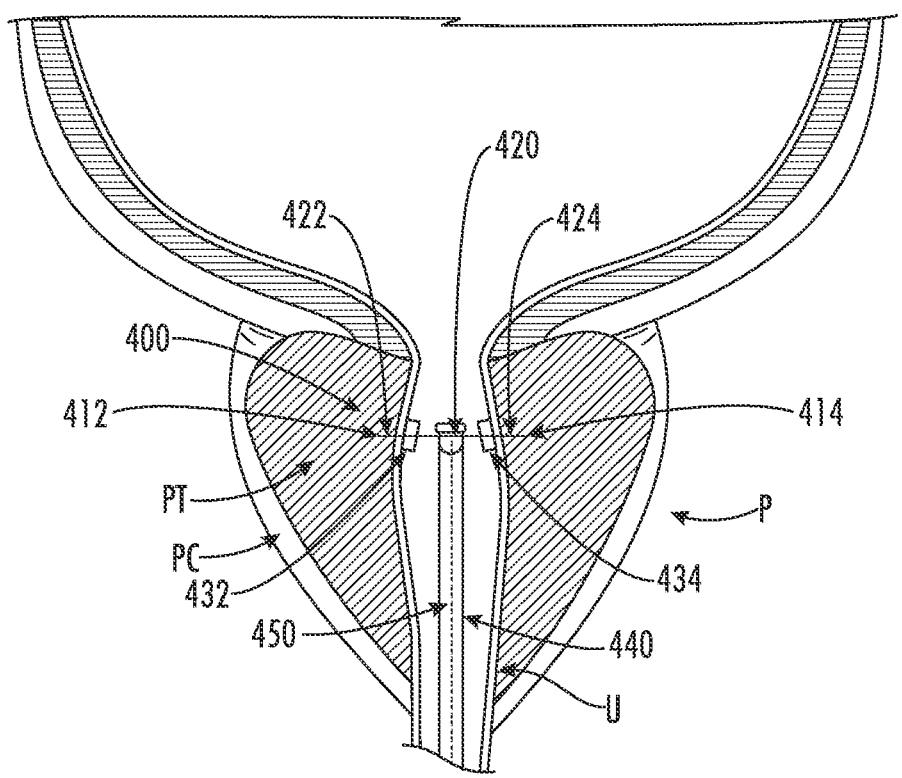
Figure 6E:
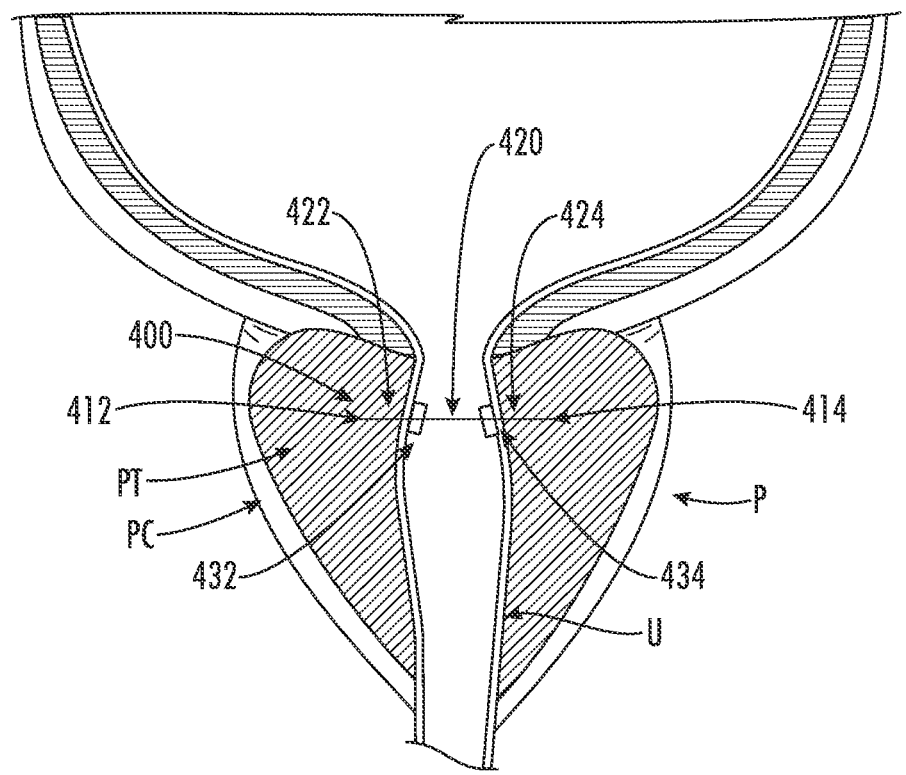
Figure 6F:
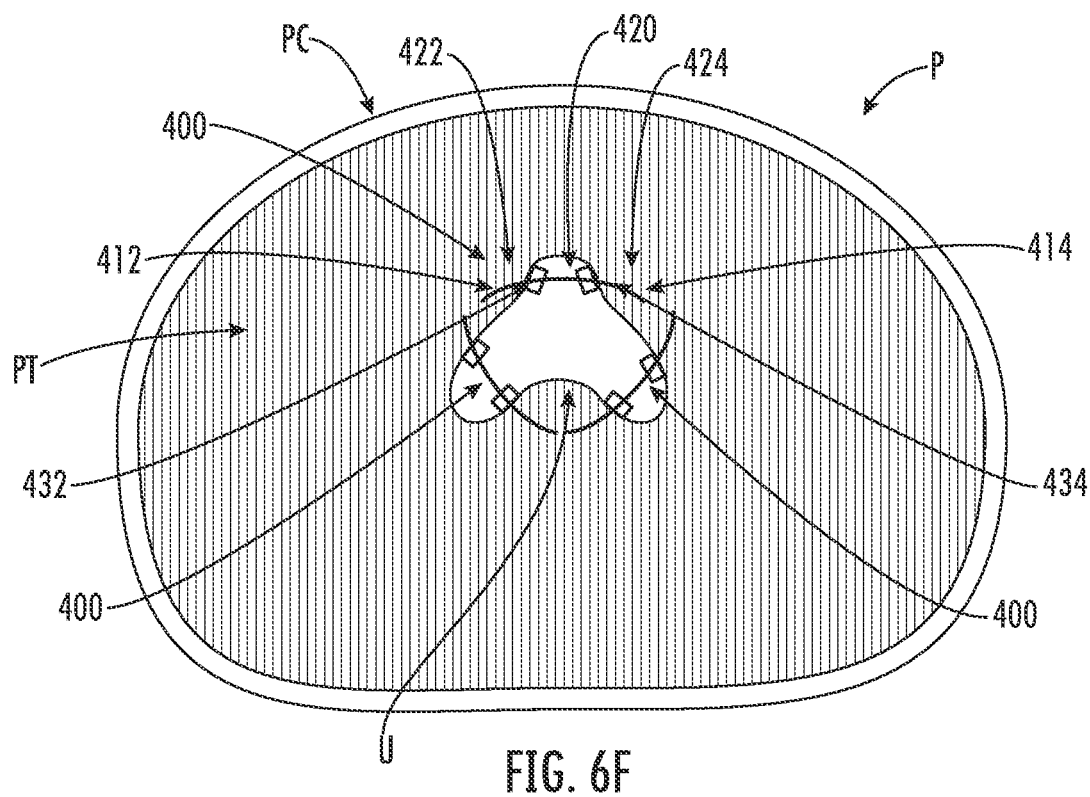
FIG. 6F is a schematic axial view of three of the implantable devices implanted within prostatic tissue in accordance with one or more embodiments of the disclosure.

FIGS. 6A-6F illustrate example methods of implanting the implantable device 400 to retract prostatic tissue PT of a patient. The device 400 may be implanted using a delivery system under visualization with a cystoscope, as described above. As shown in FIG. 6A, a sheath 440 may be inserted through the urethra U of the patient and positioned about the prostate P. The implantable device 400 may be passed through the sheath 440 along with other components of the delivery system to facilitate positioning and deployment of the device 400. As shown in FIGS. 6B and 6C, an inserter tool 450 may be used to advance the first end 412 of the shaft 410 into first prostatic tissue PT of the patient and to advance the second end 414 of the shaft 410 into second prostatic tissue PT disposed opposite the first prostatic tissue PT. In some embodiments, the first prostatic tissue PT may be pierced with the first tip of the first end 412, and the second prostatic tissue PT may be pierced with the second tip of the second end 414. In some embodiments, the device 400 may be advanced from the sheath 440 and into the prostatic urethra U while the shaft 410 is in an elastically deformed configuration, and the shaft 410 may be allowed to move toward its natural undeformed configuration within the prostatic urethra U. The central portion 420 of the shaft 410 may be positioned within the prostatic urethra U of the patient. Then, as shown in FIG. 6D, the first locking tab 432 may be moved along the first end portion 422 of the shaft 410 toward the first end 412 and into contact with the first prostatic tissue PT, and the second locking tab 434 may be moved along the second end portion 424 of the shaft 410 toward the second end 414 and into contact with the second prostatic tissue PT such that the first prostatic tissue PT and the second prostatic tissue PT are retracted. As described above, the first protrusions or recesses 426 may inhibit movement of the first locking tab 432 toward the second end 414, and the second protrusions or recesses 428 may inhibit movement of the second locking tab 434 toward the first end 412. In some embodiments, the first locking tab 432 and the second locking tab 434 may be moved simultaneously. In some embodiments, the second locking tab 434 may be moved along the second end portion 424 after the first locking tab 432 is moved along the first end portion 422. In some embodiments, as shown, the first locking tab 432 and the second locking tab 434 may reside within the prostatic urethra U in an implanted configuration. FIG. 6E shows the device 400 in an implanted state, after removal of the delivery system. Thus, the implantable device 400 may retract the prostatic tissue PT of the patient to address LUTS caused by BPH. In some embodiments, a single device 400 may be used. In other embodiments, multiple devices 400 may be implanted within different portions of prostatic tissue PT of a patient, as shown in FIG. 6F.

Figure 7A:
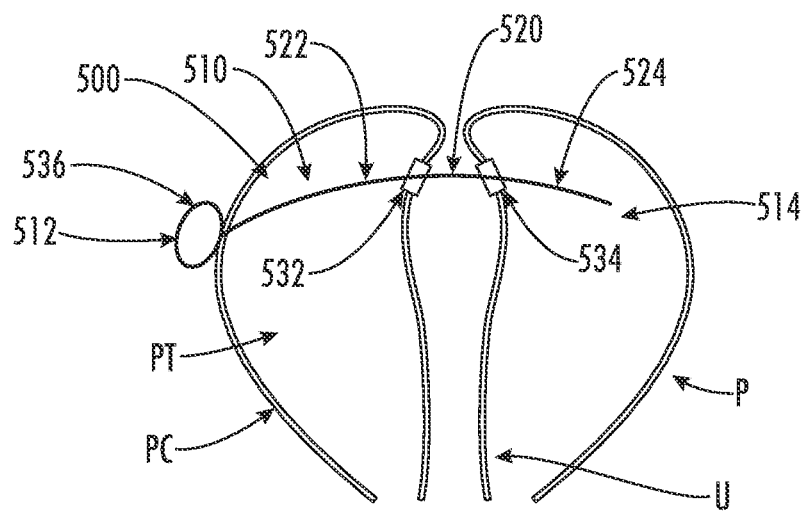
FIG. 7A is a schematic coronal view of an implantable device in accordance with one or more embodiments of the disclosure, showing the device implanted within prostatic tissue.
Figure 7B:
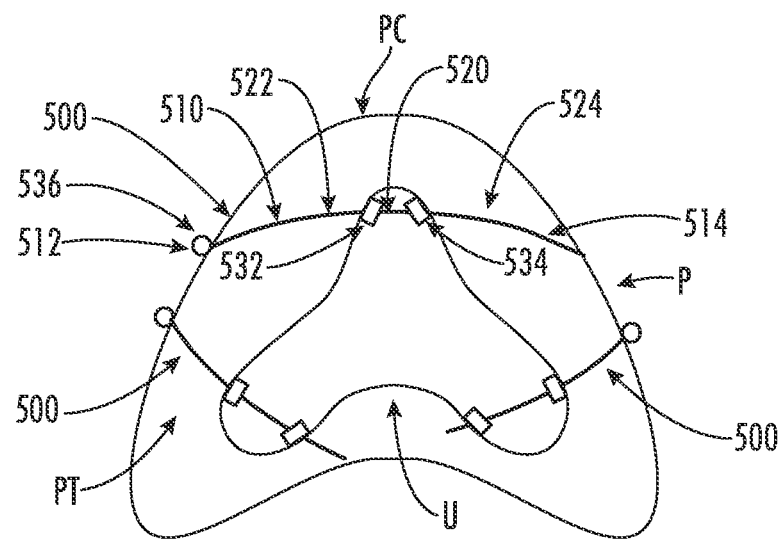
FIG. 7B is a schematic axial view of three of the implantable devices implanted within prostatic tissue in accordance with one or more embodiments of the disclosure.

FIGS. 7A and 7B illustrate another example implantable device 500 (which also may be referred to as a "prostatic tissue retractor," a "tissue retractor," or simply a "device") having a locking-tab-style configuration. The implantable device 500 generally may be configured in a manner similar to the implantable device 400 described above. In FIGS. 7A and 7B, corresponding features are identified using corresponding reference numbers. As shown, the device 500 may include a shaft 510 having a first end 512, a second end 514, a central portion 520, a first end portion 522, and a second end portion 524, a first locking tab 532, and a second locking tab 534. As compared to the device 400, the device 500 also may include a balloon 536 positioned at the first end 512 or the second end 514 of the shaft 510 and fixedly attached thereto. As shown, the balloon 536 may be configured to reside outside of the prostatic capsule PC of the patient. In other embodiments, instead of the balloon 536, the device 500 may include an end tab that is fixedly attached to the shaft 510 at the first end 512 or the second end 514. The end tab may be elastically deformable or deflectable relative to the shaft 510 and may be configured to reside outside of the prostatic capsule PC of the patient. Upon implantation of the device 500, the balloon 536 or the end tab may serve to further secure the device 500 relative to the prostatic tissue PT.

The implantable device 500 may be implanted using a method similar to that described above with respect to the implantable device 400. For example, the first end 512 of the shaft 510 may be advanced into first prostatic tissue PT of the patient, and the second end 514 of the shaft 510 may be advanced into second prostatic tissue PT disposed opposite the first prostatic tissue PT. During such insertion, the balloon 536 may be in an unexpanded configuration as it passes through the prostatic tissue PT and outside of the prostatic capsule PC. The central portion 520 of the shaft 510 may be positioned within the prostatic urethra U of the patient. Then, the balloon 536 may be expanded to its expanded configuration such that the balloon 536 is inhibited from entering the channel formed in the prostatic tissue PT, thereby securing the position of the device 500. The first locking tab 532 may be moved along the first end portion 522 of the shaft 510 toward the first end 512 and into contact with the first prostatic tissue PT, and the second locking tab 534 may be moved along the second end portion 524 of the shaft 510 toward the second end 514 and into contact with the second prostatic tissue PT such that the first prostatic tissue PT and the second prostatic tissue PT are retracted. In some embodiments, the first locking tab 532 and the second locking tab 534 may be moved after expanding the balloon 536. In other embodiments, the first locking tab 532 and the second locking tab 534 may be moved before the balloon 536 is expanded. For embodiments in which an end tab is used instead of a balloon, the end tab may be deformed or deflected from its natural configuration to a deformed or displaced configuration as the respective end of the shaft 510 passes through the prostatic tissue PT and outside of the prostatic capsule PC. Upon exiting the prostatic tissue PT, the end tab may be allowed to return to or toward its natural configuration such that the end tab is inhibited from entering the channel formed in the prostatic tissue PT, thereby securing the position of the device 500. Thus, the implantable device 500 may retract the prostatic tissue PT of the patient to address LUTS caused by BPH. In some embodiments, a single device 500 may be used. In other embodiments, multiple devices 500 may be implanted within different portions of prostatic tissue PT of a patient, as shown in FIG. 7B.

FIGS. 8A-8C depict embodiments of an example implantable device 600 (which also may be referred to as a "prostatic tissue retractor," a "tissue retractor," or simply a "device"). The implantable device 600 is configured for retracting prostatic tissue PT of a patient to treat LUTS caused by BPH. In some embodiments, the device 600 may be implanted in a minimally-invasive manner. An example placement of the implantable device 600 is depicted in FIG. 8A. In some embodiments, multiple devices 600 may be used for a single patient.

The implantable device 600 generally may include a main body 610 and a plurality of barbs 640 extending outwardly from the main body 610. The main body 610 may have a proximal end 612 and a distal end 614 disposed opposite one another in a direction of a longitudinal axis of the main body 610. As shown, the main body 610 may include a proximal end portion 622 and a distal end portion 624. In some embodiments, the main body 610 may be rigid. In some embodiments, as shown, the main body 610 may have a linear shape. In some embodiments, the main body 610 may have a curved or otherwise contoured shape. In some embodiments, the main body 610 may be formed of a flexible material and at least a portion of the main body 610 may be configured to be elastically deformed from a natural undeformed configuration to a deformed configuration. Example materials may include nitinol, PEEK, Pebax, stainless steel, polyethylene, polypropylene, polyester, polyamide, and fluoropolymer, although other biocompatible materials may be used. In some embodiments, the main body 610 may have a linear shape when the main body 610 is in the natural undeformed configuration. In some embodiments, the main body 610 may have a curved or otherwise contoured shape when the main body 610 is in the natural undeformed configuration. In some embodiments, as shown in FIG. 8A, the main body 610 may be configured to extend through prostatic tissue PT of the patient. In some embodiments, the main body 610 may be configured to extend partially through prostatic tissue PT of the patient, with the distal end 614 of the main body 610 residing within the prostatic tissue PT. As shown, the implantable device 600 also may include a flange 630 that is fixedly attached to the proximal portion 622 of the main body 610 and extends outward therefrom. The flange 630 may be configured to reside within the prostatic urethra U of the patient and to contact the prostatic tissue PT.

As shown, the barbs 640 may be disposed along the distal end portion 624 of the main body 610, while the proximal end portion 622 of the main body 610 may be devoid of barbs 640. The barbs 640 may be configured to engage the prostatic tissue PT of the patient. Each of the barbs 640 may be configured to move relative to the main body 610. In some embodiments, each of the barbs 640 may be fixedly attached to the main body 610 and configured to be elastically deformed or deflected from a first configuration to a second configuration, such as when the barbs 640 are advanced into or through the prostatic tissue PT. For example, the barbs 640 may be integrally formed with the main body 610 and configured to be elastically deformed or deflected relative to the main body 610. In some embodiments, the barbs 640 may be separately formed from the main body 610 but attached to the main body 610 and configured to be elastically deformed or deflected relative to the main body 610. For example, as shown in FIGS. 8B and 8C, the barbs 640 may extend through respective openings defined in the main body 610, with each of the barbs 640 including a base portion positioned within the main body 610 and a free end portion positioned outside of the main body 610. In some embodiments, the implantable device 600 also may include a central pin 650, as shown in FIGS. 8B and 8C. The central pin 650 may be removably positioned within the main body 610 and configured to inhibit movement of the barbs 640 inward toward the longitudinal axis of the main body 610 when the central pin 650 is positioned within the main body 610. In some instances, the central pin 650 may be removed from the main body 610 to allow the barbs 640 to move inward relative to the main body 610, for example to ease removal of the device 600 from a patient. In some embodiments, the central pin 650 may be removably attached to the main body 610, for example by a threaded connection or other means of releasable mechanical attachment.

The implantable device 600 may be implanted using a method generally similar to that described above with respect to the implantable device 100. The device 600 may be implanted using a delivery system under visualization with a cystoscope, as described above. A sheath may be inserted through the urethra U of the patient and positioned about the prostate P. The device 600 may be passed through a working lumen of the sheath, along with other components of the delivery system to facilitate positioning and deployment of the device 600 under visualization through a cystoscope lumen of the sheath. In some embodiments, an obturator or cannula may be used to form a channel through prostatic tissue PT of the patient, with the channel extending from the prostatic urethra U to the prostatic capsule PC of the patient. In other embodiments, the device 600 may be passed through the prostatic tissue PT without first forming a channel. As noted above, the barbs 640 may be elastically deformed or deflected when the barbs 640 are advanced into or through the prostatic tissue PT. In some embodiments, the device 600 may be positioned such that the device 600 extends from the prostatic urethra U to the prostatic capsule PC. In some embodiments, as shown in FIG. 8A, the main body 610 may extend through the prostatic tissue PT, with the distal end 614 positioned outside of the prostatic capsule PC. In some embodiments, the main body 610 may extend only partially through the prostatic tissue PT, with the distal end 614 positioned within the prostatic tissue PT. In some embodiments, as shown in FIG. 8A, one or more of the barbs 640 may be positioned outside of the prostatic capsule PC, while other barbs 640 may be positioned within the prostatic tissue PT. In some embodiments, all of the barbs 640 may be positioned within the prostatic tissue PT. As shown, the flange 630 may be positioned within the prostatic urethra U and in contact with the prostatic tissue PT. In this manner, the prostatic tissue PT may be compressed between the flange 630 and the barbs 640. Thus, the implantable device 600 may retract the prostatic tissue PT of the patient to address LUTS caused by BPH. It will be appreciated that the extent to which the barbs 640 are advanced into and/or through the prostatic tissue PT may be selected to achieve a desired degree of retraction of the prostatic tissue PT for a particular patient. In some embodiments, a single device 600 may be used. In other embodiments, multiple devices 600 may be implanted within different portions of prostatic tissue PT of a patient.

Figure 9:
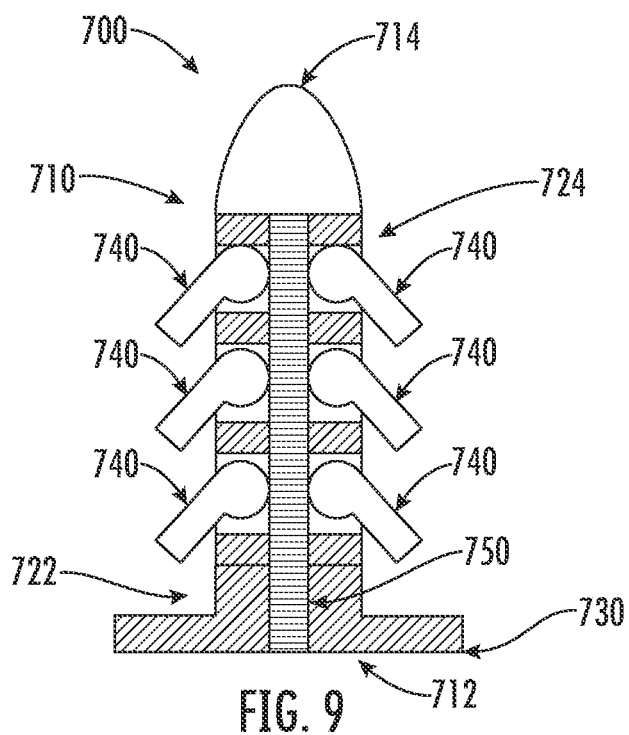
FIG. 9 is a schematic partial cross-sectional view of an implantable device in accordance with one or more embodiments of the disclosure.

FIG. 9 illustrates another example implantable device 700 (which also may be referred to as a "prostatic tissue retractor," a "tissue retractor," or simply a "device") having barbs. The implantable device 700 generally may be configured in a manner similar to the implantable device 600 described above. In FIG. 9, corresponding features are identified using corresponding reference numbers. As shown, the device 700 may include a main body 710 having a proximal end 712, a distal end 714, a proximal end portion 722, and a distal end portion 724. The device 700 also may include a flange 730, a plurality of barbs 740, and a central pin 750. As compared to the barbs 640 of the device 600, the barbs 740 of the device 700 may be pivotally attached to the main body 710 and configured to pivot relative to the main body 710 from a first configuration to a second configuration, such as when the barbs 740 are advanced into or through the prostatic tissue PT. In some embodiments, as shown, adjacent portions of the main body 710 may be configured to limit a range of pivotal movement of the respective barbs 740 relative to the main body 710. In this manner, the main body 710 may limit pivotal movement of the barbs 740 in an outward direction as well as in an inward direction. Various means may be used to form the pivotal connection between the barbs 740 and the main body 710, such as a pin connection, a ball-and-socket connection, and the like. The implantable device 700 may be implanted using a method similar to that described above with respect to the implantable device 600.

Figure 10:
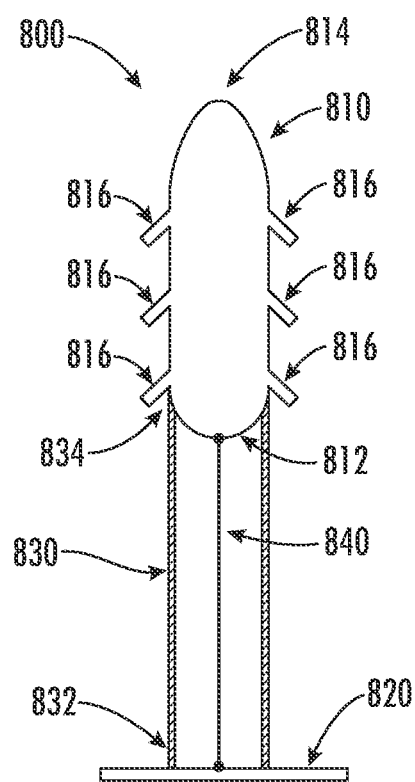
FIG. 10 is a schematic partial cross-sectional view of an implantable device in accordance with one or more embodiments of the disclosure.

Referring now to FIG. 10, another example implantable device 800 (which also may be referred to as a "prostatic tissue retractor," a "tissue retractor," or simply a "device") is depicted. The implantable device 800 is configured for retracting prostatic tissue PT of a patient to treat LUTS caused by BPH. In some embodiments, the device 800 may be implanted in a minimally-invasive manner. In some embodiments, multiple devices 800 may be used for a single patient.

The implantable device 800 generally may include a distal body 810, a plurality of barbs 816 extending outwardly from the distal body 810, a proximal body 820, an intermediate body 830 extending between the distal body 810 and the proximal body 820, and a tether 840 extending between the distal body 810 and the proximal body 820. The distal body 810 may have a proximal end 812 and a distal end 814 disposed opposite one another in a direction of a longitudinal axis of the distal body 810. In some embodiments, the distal body 810 may be rigid. In some embodiments, the distal body 810 may be formed of a flexible material and at least a portion of the distal body 810 may be configured to be elastically deformed from a natural undeformed configuration to a deformed configuration. Example materials may include nitinol, PEEK, Pebax, stainless steel, polyethylene, polypropylene, polyester, polyamide, and fluoropolymer, although other biocompatible materials may be used. The distal body 810 may be configured to extend at least partially through prostatic tissue PT of the patient, with the distal end 814 of the distal body 810 residing either within the prostatic tissue PT or outside of the prostatic capsule PC. The proximal body 820 may be configured to reside within the prostatic urethra U of the patient and to contact the prostatic tissue PT.

As shown, the barbs 816 may be disposed along a portion of the distal body 810. The barbs 816 may be configured to engage the prostatic tissue PT of the patient. Each of the barbs 816 may be configured to move relative to the distal body 810. In some embodiments, each of the barbs 816 may be fixedly attached to the distal body 810 and configured to be elastically deformed or deflected from a first configuration to a second configuration, such as when the barbs 816 are advanced into or through the prostatic tissue PT. For example, the barbs 816 may be integrally formed with the distal body 810 and configured to be elastically deformed or deflected relative to the distal body 810. In some embodiments, the barbs 816 may be separately formed from the distal body 810 but attached to the distal body 810 and configured to be elastically deformed or deflected relative to the distal body 810. In some embodiments, the barbs 816 may be separately formed from and pivotally attached to the distal body 810.

The intermediate body 830 may be fixedly attached to each of the distal body 810 and the proximal body 820, as shown. In some embodiments, the intermediate body 830 may have a tubular shape that surrounds the tether 840. The intermediate body 830 may be formed of a bioerodeable material, such as PLA, PGA, polycaprolactone, or magnesium, and thus may erode over time after implantation of the device 800 within a patient. In this manner, the intermediate body 830 may facilitate implantation of the device 800, maintaining a spacing between and relative orientation of the distal body 810 and the proximal body 820 during implantation. The tether 840 may be fixedly attached to each of the distal body 810 and the proximal body 820, as shown. In some embodiments, the tether 840 may be flexible. In some embodiments, the tether 840 may be or may include a non-absorbable suture. After erosion of the intermediate body 830, the distal body 810 and the proximal body 820 may remain attached to one another by the tether 840.

The implantable device 800 may be implanted using a method generally similar to that described above with respect to the implantable device 100. The device 800 may be implanted using a delivery system under visualization with a cystoscope, as described above. A sheath may be inserted through the urethra U of the patient and positioned about the prostate P. The device 800 may be passed through a working lumen of the sheath, along with other components of the delivery system to facilitate positioning and deployment of the device 800 under visualization through a cystoscope lumen of the sheath. In some embodiments, an obturator or cannula may be used to form a channel through prostatic tissue PT of the patient, with the channel extending from the prostatic urethra U to the prostatic capsule PC of the patient. In other embodiments, the device 800 may be passed through the prostatic tissue PT without first forming a channel. As noted above, the barbs 816 may be elastically deformed or deflected when the barbs 816 are advanced into or through the prostatic tissue PT. In some embodiments, the device 800 may be positioned such that the device 800 extends from the prostatic urethra U to the prostatic capsule PC. In some embodiments, the device 800 may extend through the prostatic tissue PT, with the distal end 814 of the distal body 810 positioned outside of the prostatic capsule PC. In some embodiments, the device 800 may extend only partially through the prostatic tissue PT, with the distal end 814 of the distal body 810 positioned within the prostatic tissue PT. In some embodiments, the intermediate body 830 may extend partially through the prostatic tissue PT, and the tether 840 may extend partially through the prostatic tissue PT. In some embodiments, one or more of the barbs 816 may be positioned outside of the prostatic capsule PC, while other barbs 816 may be positioned within the prostatic tissue PT. In some embodiments, all of the barbs 816 may be positioned within the prostatic tissue PT. The proximal body 820 may be positioned within the prostatic urethra U and in contact with the prostatic tissue PT. In this manner, the prostatic tissue PT may be compressed between the proximal body 820 and the barbs 816. Thus, the implantable device 800 may retract the prostatic tissue PT of the patient to address LUTS caused by BPH. It will be appreciated that the extent to which the barbs 816 are advanced into and/or through the prostatic tissue PT may be selected to achieve a desired degree of retraction of the prostatic tissue PT for a particular patient. In some embodiments, a single device 800 may be used. In other embodiments, multiple devices 800 may be implanted within different portions of prostatic tissue PT of a patient.

Figure 11:
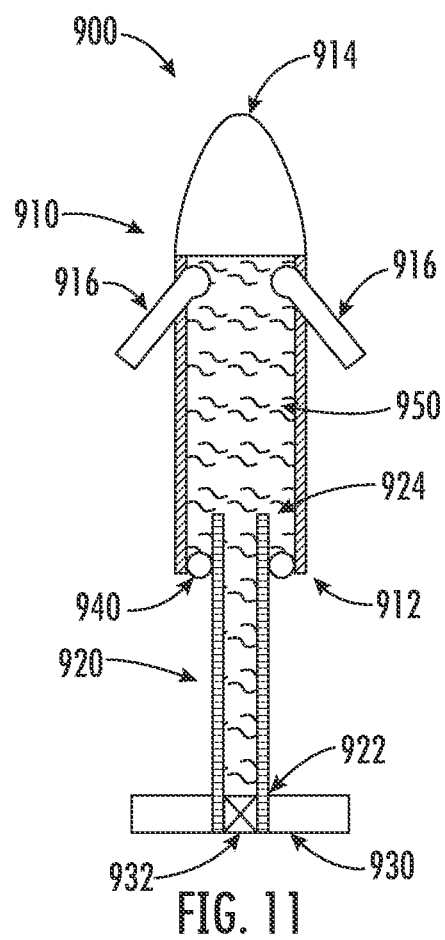
FIG. 11 is a schematic partial cross-sectional view of an implantable device in accordance with one or more embodiments of the disclosure.

FIG. 11 depicts an example implantable device 900 (which also may be referred to as a "prostatic tissue retractor," a "tissue retractor," or simply a "device") that utilizes a hydraulic mechanism. The implantable device 900 is configured for retracting prostatic tissue PT of a patient to treat LUTS caused by BPH. In some embodiments, the device 900 may be implanted in a minimally-invasive manner. In some embodiments, multiple devices 900 may be used for a single patient.

The implantable device 900 generally may include a distal body 910, a plurality of barbs 916 extending outwardly from the distal body 910, a proximal body 920, and a flange 930. The distal body 910 may have a proximal end 912 and a distal end 914 disposed opposite one another in a direction of a longitudinal axis of the distal body 910. In some embodiments, the distal body 910 may be rigid. In some embodiments, the distal body 910 may be formed of a flexible material. Example materials may include nitinol, PEEK, Pebax, stainless steel, polyethylene, polypropylene, polyester, polyamide, and fluoropolymer, although other biocompatible materials may be used. The distal body 910 may be configured to extend at least partially through prostatic tissue PT of the patient, with the distal end 914 of the distal body 910 residing either within the prostatic tissue PT or outside of the prostatic capsule PC. The proximal body 920 may have a proximal end 922 and a distal end 924 disposed opposite one another in a direction of a longitudinal axis of the proximal body 920. In some embodiments, the proximal body 920 may be rigid. In some embodiments, the proximal body 920 may be formed of a flexible material. Example materials may include nitinol, PEEK, Pebax, stainless steel, polyethylene, polypropylene, polyester, polyamide, and fluoropolymer, although other biocompatible materials may be used. The proximal body 920 may be configured to extend at least partially through prostatic tissue PT of the patient, with the distal end 924 of the proximal body 920 residing within the prostatic tissue PT and the proximal end 922 residing within the prostatic urethra U of the patient. As shown, the flange 930 may be fixedly attached to the proximal body 920 at the proximal end 922 thereof. In this manner, the flange 930 may be configured to reside within the prostatic urethra U of the patient and to contact the prostatic tissue PT.

As shown, the barbs 916 may be disposed along a portion of the distal body 910. The barbs 916 may be configured to engage the prostatic tissue PT of the patient. Each of the barbs 916 may be configured to move relative to the distal body 910. In some embodiments, as shown, the barbs 916 may be separately formed from the distal body 910 but attached to the distal body 910 and configured to pivot relative to the distal body 910. In some embodiments, the barbs 916 may be separately formed from the distal body 910 but attached to the distal body 910 and configured to be elastically deformed or deflected relative to the distal body 910. In some embodiments, the barbs 916 may be integrally formed with the distal body 910 and configured to be elastically deformed or deflected relative to the distal body 910.

The distal body 910 may define a reservoir within the distal body 910. The proximal body 920 similarly may define a reservoir within the proximal body 920 and in fluid communication with the reservoir of the distal body 910. As shown, a fluid 950 may be contained within the reservoirs of the distal body 910 and the proximal body 920. The fluid 950 may include any suitable biocompatible, noncompressible fluids, such as saline, water, adhesives, acrylics, epoxies, or polymethylmethacrylate. As shown, the device 900 may include a port 932 positioned at the proximal end 922 of the proximal body 920 and in fluid communication with the reservoirs of the distal body 910 and the proximal body 920. As discussed below, the port 932 may facilitate withdrawal of a portion of the fluid 950 from the reservoirs of the distal body 910 and the proximal body 920 during implantation of the device 900. In some embodiments, the port 932 may include a valve, such as a self-sealing valve. As shown, the proximal body 920 may be translatably attached to the distal body 910. In this manner, the proximal body 920 may be configured to translate relative to the distal body 910 from an extended configuration to a retracted configuration. Specifically, the proximal body 920 may be configured to translate relative to the distal body 910 from an extended configuration to a retracted configuration when a portion of the fluid 950 is withdrawn from the reservoirs of the distal body 910 and the proximal body 920 via the port 932. As shown, the device 900 may include a seal 940 positioned at an interface between the distal body 910 and the proximal body 920 to prevent leakage of the fluid 950 therebetween.

The implantable device 900 may be implanted using a method generally similar to that described above with respect to the implantable device 100. The device 900 may be implanted using a delivery system under visualization with a cystoscope, as described above. A sheath may be inserted through the urethra U of the patient and positioned about the prostate P. The device 900 may be passed through a working lumen of the sheath, along with other components of the delivery system to facilitate positioning and deployment of the device 900 under visualization through a cystoscope lumen of the sheath. In some embodiments, an obturator or cannula may be used to form a channel through prostatic tissue PT of the patient, with the channel extending from the prostatic urethra U to the prostatic capsule PC of the patient. In other embodiments, the device 900 may be passed through the prostatic tissue PT without first forming a channel. As noted above, the barbs 916 may pivot or may be elastically deformed or deflected when the barbs 916 are advanced into or through the prostatic tissue PT. In some embodiments, the device 900 may be positioned such that the device 900 extends from the prostatic urethra U to the prostatic capsule PC. In some embodiments, the device 900 may extend through the prostatic tissue PT, with the distal end 914 of the distal body 910 positioned outside of the prostatic capsule PC. In some embodiments, the device 900 may extend only partially through the prostatic tissue PT, with the distal end 914 of the distal body 910 positioned within the prostatic tissue PT. In some embodiments, one or more of the barbs 916 may be positioned outside of the prostatic capsule PC, while other barbs 916 may be positioned within the prostatic tissue PT. In some embodiments, all of the barbs 816 may be positioned outside of the prostatic capsule PC. In some embodiments, all of the barbs 816 may be positioned within the prostatic tissue PT. The proximal body 920 may be positioned partially within the prostatic tissue PT and partially within the prostatic urethra U. The flange 930 may be positioned within the prostatic urethra U and in contact with the prostatic tissue PT. As noted above, a portion of the fluid 950 may be withdrawn from the reservoirs of the distal body 910 and the proximal body 920 via the port 932 such that the proximal body 920 translates relative to the distal body 910 from an extended configuration to a retracted configuration. In this manner, the prostatic tissue PT may be compressed between the flange 930 and the barbs 916. Thus, the implantable device 900 may retract the prostatic tissue PT of the patient to address LUTS caused by BPH. It will be appreciated that the amount of fluid 950 that is withdrawn may be selected to achieve a desired degree of retraction of the prostatic tissue PT for a particular patient. In some embodiments, a single device 900 may be used. In other embodiments, multiple devices 900 may be implanted within different portions of prostatic tissue PT of a patient.

FIGS. 12A-12C depict an example implantable device 1000 (which also may be referred to as a "prostatic tissue retractor," a "tissue retractor," or simply a "device") that utilizes a deformable or peelable main body. The implantable device 1000 is configured for retracting prostatic tissue PT of a patient to treat LUTS caused by BPH. In some embodiments, the device 1000 may be implanted in a minimally-invasive manner. In some embodiments, multiple devices 1000 may be used for a single patient.

The implantable device 1000 generally may include a main body 1010, a flange 1030, and a suture 1040. The main body 1010 may have a proximal end 1012 and a distal end 1014 disposed opposite one another in a direction of a longitudinal axis of the main body 1010. The main body 1010 may be formed of a deformable or peelable material, such as Pebax, polyethylene, polypropylene, polyester, polyamide, or fluoropolymer, although other suitable materials may be used. The main body 1010 may be configured to extend through prostatic tissue PT of the patient, with the distal end 1014 of the main body 1010 residing outside of the prostatic capsule PC and the proximal end 1012 of the main body 1010 residing within the prostatic urethra U. The main body 1010 may include a distal end portion 1016 that is configured to reside at least partially outside of the prostatic capsule PC, as shown in FIG. 12B. The distal end portion 1016 may be configured to deform from an undeformed configuration, as shown in FIGS. 12A and 12B, to a deformed configuration, as shown in FIG. 12C. The suture 1040 may include a first end 1042, a second end 1044, and an intermediate portion 1046 extending between the ends 1042, 1044. As shown, the ends 1042, 1044 may extend from the proximal end 1012 of the main body 1010.

The suture 1040 may be configured to cause the distal end portion 1016 of the main body 1010 to deform from the undeformed configuration to the deformed configuration when the first end 1042 and the second end 1044 are pulled proximally relative to the main body 1010. As shown, portions of the suture 1040 may extend through the main body 1010, while other portions of the suture 1040 extend along an outer surface of the distal end portion 1016 of the main body 1010. The main body 1010 may include a plurality of openings that guide the suture 1040 through and along the main body 1010. As shown, the main body 1010 may include a plurality of proximal openings 1022, a distal opening 1024, and a plurality of side openings 1026. The suture 1040 may include a plurality of segments connected in series between the first end 1042 and the second end 1044, with each segment interfacing with different portions of the main body 1010. As shown, a first segment may extend from the first end 1042 through a first proximal opening 1022 and through the main body 1010 to a first side opening 1026, a second segment may extend from the first side opening 1026 and along the outer surface of the distal end portion 1016 to the distal opening 1024, a third segment may extend from the distal opening 1024 through the main body 1010 and through a second proximal opening 1022, a fourth segment may extend through a third proximal opening 1022 through the main body 1010 and through the distal opening 1024, a fifth segment may extend from the distal opening 1024 along the outer surface of the distal end portion 1016 to a second side opening 1026, and a sixth segment may extend from the second side opening 1026 through the main body 1010 to the second end 1044. Alternative arrangements of the suture 1040 may be used in other embodiments. When the first end 1042 and the second end 1044 are pulled proximally relative to the main body 1010, the distal end portion 1016 may be deformed from the undeformed configuration to the deformed configuration. Specifically, such pulling of the suture 1040 may cause the distal end portion 1016 to deform radially outward relative to the longitudinal axis of the main body 1010 from the undeformed configuration to the deformed configuration, as shown in FIG. 12C. In some embodiments, as shown, the deformation of the distal end portion 1016 may include separation of respective segments of the distal end portion 1016 from one another. In some embodiments, the distal end portion 1016 may include one or more zones of weakness 1018 configured to facilitate separation of the respective segments of the distal end portion from one another. For example, the zones of weakness 1018 may include perforations defined in the distal end portion 1016.

The implantable device 1000 may be implanted using a method generally similar to that described above with respect to the implantable device 100. The device 1000 may be implanted using a delivery system under visualization with a cystoscope, as described above. A sheath may be inserted through the urethra U of the patient and positioned about the prostate P. The device 1000 may be passed through a working lumen of the sheath, along with other components of the delivery system to facilitate positioning and deployment of the device 1000 under visualization through a cystoscope lumen of the sheath. In some embodiments, an obturator or cannula may be used to form a channel through prostatic tissue PT of the patient, with the channel extending from the prostatic urethra U to the prostatic capsule PC of the patient. In other embodiments, the device 1000 may be passed through the prostatic tissue PT without first forming a channel. In some embodiments, as shown in FIG. 12B, the device 1000 may extend through the prostatic tissue PT, with the distal end 1014 of the main body 1010 positioned outside of the prostatic capsule PC. Specifically, at least a portion of the distal end portion 1016 may be positioned outside of the prostatic capsule PC. The flange 1030 may be positioned within the prostatic urethra U and in contact with the prostatic tissue PT. As noted above, the distal end portion 1016 may be deformed from an undeformed configuration to a deformed configuration by pulling the ends 1042, 1044 of the suture 1040 proximally relative to the main body 1010. In this manner, the prostatic tissue PT may be compressed between the flange 1030 and the deformed distal end portion 1016. Thus, the implantable device 1000 may retract the prostatic tissue PT of the patient to address LUTS caused by BPH. It will be appreciated that the extent of deformation of the distal end portion 1016 may be selected to achieve a desired degree of retraction of the prostatic tissue PT for a particular patient. After achieving a desired degree of retraction, the free end portions of the suture 1040 may be secured relative to the main body 1010. In some embodiments, a cap 1050 may be used to secure the free end portions of the suture 1040 to the main body 1010 and/or the flange 1030. In some embodiments, the free end portions of the suture 1040 may be tied into knots. In some embodiments, the free end portions of the suture 1040 may secured by an additional capture mechanism of the device 1000. In some embodiments, the free end portions of the suture 1040 may be cut off or otherwise removed after securing or tying. In some embodiments, a single device 1000 may be used. In other embodiments, multiple devices 1000 may be implanted within different portions of prostatic tissue PT of a patient.

Figure 13A:
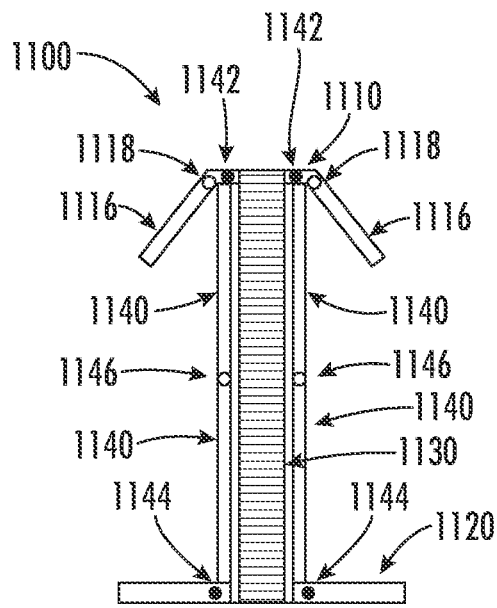
FIG. 13A is a schematic plan view of an implantable device in accordance with one or more embodiments of the disclosure.
Figure 13B:
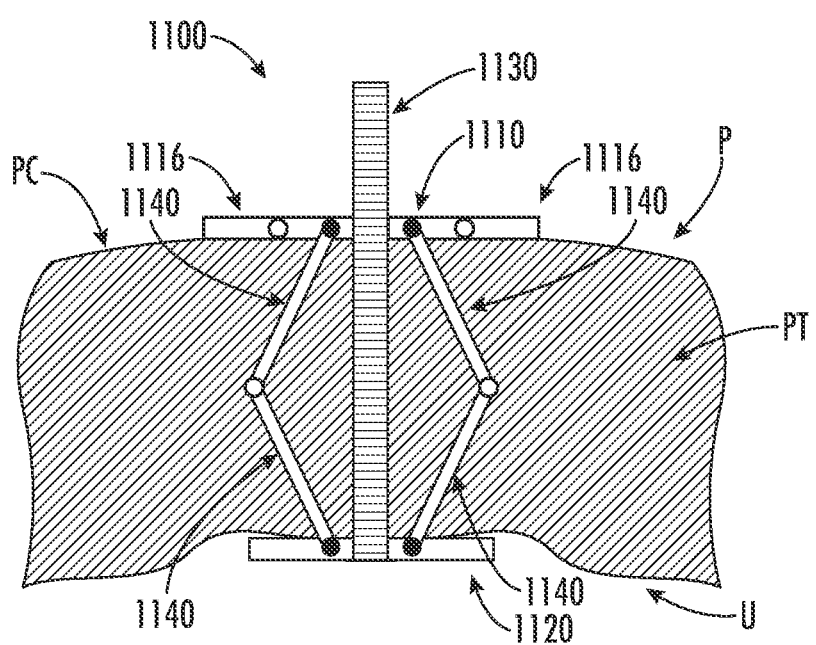
FIG. 13B is a schematic coronal view of the implantable device of FIG. 13A in accordance with one or more embodiments of the disclosure, showing the device implanted within prostatic tissue.

FIGS. 13A and 13B illustrate another example implantable device 1100 (which also may be referred to as a "prostatic tissue retractor," a "tissue retractor," or simply a "device") having a jack-style configuration. The implantable device 1100 is configured for retracting prostatic tissue PT of a patient to treat LUTS caused by BPH. In some embodiments, the device 1100 may be implanted in a minimally-invasive manner. An example placement of the implantable device 1100 is depicted in FIG. 13B. In some embodiments, multiple devices 1100 may be used for a single patient.

The implantable device 1100 generally may include a distal body 1110, a plurality of barbs 1116 extending outwardly from the distal body 1110, a proximal body 1120, a shaft 1130 movably attached to each of the distal body 1110 and the proximal body 1120, and two pairs of link arms 1140 extending between the distal body 1110 and the proximal body 1120. As shown, the distal body 1110 and the proximal body 1120 each may be formed as plate-like members positioned at opposite ends of the device 1100, although other shapes and configurations of the distal body 1110 and the proximal body 1120 may be used in other embodiments. In some embodiments, the distal body 1110 and the proximal body 1120 may be rigid. In some embodiments, the distal body 1110 and the proximal body 1120 may be formed of a flexible material and at least portions of the distal body 1110 and the proximal body 1120 may be configured to be elastically deformed from a natural undeformed configuration to a deformed configuration. Example materials may include nitinol, PEEK, Pebax, stainless steel, polyethylene, polypropylene, polyester, polyamide, and fluoropolymer, although other biocompatible materials may be used. In some embodiments, as shown in FIG. 13B, the distal body 1110 may be configured to reside outside of the prostatic capsule PC of the patient, and the proximal body 1120 may be configured to reside within the prostatic urethra U of the patient and to contact the prostatic tissue PT.

As shown, the barbs 1116 may be attached to the distal body 1110 and may extend outwardly therefrom. The barbs 1116 may be configured to engage the prostatic capsule PC or the prostatic tissue PT of the patient. Each of the barbs 1116 may be configured to move relative to the distal body 1110. In some embodiments, as shown, each of the barbs 1116 may be pivotally attached to the distal body 1110 via respective hinges 1118 and configured to pivot from a first configuration to a second configuration, such as when the barbs 1116 are advanced into or through the prostatic tissue PT. In some embodiments, each of the barbs 1116 may be fixedly attached to the distal body 1110 and configured to be elastically deformed or deflected from a first configuration to a second configuration, such as when the barbs 1116 are advanced into or through the prostatic tissue PT. For example, the barbs 1116 may be integrally formed with the distal body 1110 and configured to be elastically deformed or deflected relative to the distal body 1110.

The shaft 1130 may be movably attached to each of the distal body 1110 and the proximal body 1120 and configured to adjust a spacing between the distal body 1110 and the proximal body 1120 and then maintain a desired spacing after such adjustment. For example, the shaft 1130 may be threadedly attached to the distal body 1110 and rotatably attached to the proximal body 1120. In this manner, the shaft 1130 may be configured to move the distal body 1110 toward the proximal body 1120 when the shaft 1130 is rotated relative to the proximal body 1120 in a first direction, and to move the distal body 1110 away from the proximal body 1120 when the shaft 1130 is rotated relative to the proximal body 1120 in a second direction opposite the first direction. As shown in FIG. 13B, the shaft 1130 may be configured to extend through the prostatic tissue PT of the patient. Each pair of the link arms 1140 may include a first link arm 1140 that is pivotally attached to the distal body 1110 at a hinge 1142, and a second link arm 1140 that is pivotally attached to the proximal body 1120 at a hinge 1144 and pivotally attached to the first link arm 1140 at a hinge 1146. In this manner, the pairs of link arms 1140 may maintain a relative orientation between the distal body 1110 and the proximal body 1120 as the spacing of the distal body 1110 and the proximal body 1120 is adjusted via the shaft 1130. As shown in FIG. 13B, the pairs of link arms 1140 may extend through the prostatic tissue PT and outwardly away from the shaft 1130 into the prostatic tissue PT. Although two pairs of the link arms 1140 are shown in the illustrated embodiments, additional pairs of link arms 1140 may be used in other embodiments.

The implantable device 1100 may be implanted using a method generally similar to that described above with respect to the implantable device 100. The device 1100 may be implanted using a delivery system under visualization with a cystoscope, as described above. A sheath may be inserted through the urethra U of the patient and positioned about the prostate P. The device 1100 may be passed through a working lumen of the sheath, along with other components of the delivery system to facilitate positioning and deployment of the device 1100 under visualization through a cystoscope lumen of the sheath. In some embodiments, an obturator or cannula may be used to form a channel through prostatic tissue PT of the patient, with the channel extending from the prostatic urethra U to the prostatic capsule PC of the patient. In other embodiments, the device 1100 may be passed through the prostatic tissue PT without first forming a channel. As noted above, the barbs 1116 may pivot or may be elastically deformed or deflected when the barbs 1116 are advanced into or through the prostatic tissue PT. In some embodiments, the device 1100 may be positioned such that the device 1100 extends from the prostatic urethra U to the prostatic capsule PC. In some embodiments, as shown in FIG. 13B, the shaft 1130 and the pairs of link arms 1140 may extend through the prostatic tissue PT, the distal body 1110 and the barbs 1116 may be positioned outside of the prostatic capsule PC, and the proximal body 1120 may be positioned within the prostatic urethra U and in contact with the prostatic tissue PT. After so positioning the device 1100, the shaft 1130 may be rotated in a first direction such that the distal body 1110 moves toward the proximal body 1120. In this manner, the prostatic tissue PT may be compressed between the proximal body 1120 and the distal body 1110 and/or the barbs 1116. Thus, the implantable device 1100 may retract the prostatic tissue PT of the patient to address LUTS caused by BPH. It will be appreciated that the extent to which the distal body 1110 is moved toward the proximal body 1120 may be selected to achieve a desired degree of retraction of the prostatic tissue PT for a particular patient. In some embodiments, a single device 1100 may be used. In other embodiments, multiple devices 1100 may be implanted within different portions of prostatic tissue PT of a patient.

Although specific embodiments of the disclosure have been described, one of ordinary skill in the art will recognize that numerous other modifications and alternative embodiments are within the scope of the disclosure. For example, while various illustrative implementations and structures have been described in accordance with embodiments of the disclosure, one of ordinary skill in the art will appreciate that numerous other modifications to the illustrative implementations and structures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

What is claimed is:

1. An implantable device for retracting prostatic tissue of a patient, the implantable device comprising:
   a shaft having a proximal end and a distal end disposed opposite one another in a direction of a longitudinal axis of the shaft;
   a proximal balloon fixedly attached to the shaft, the proximal balloon disposed closer to the proximal end than to the distal end;
   a distal balloon fixedly attached to the shaft, the distal balloon disposed closer to the distal end than to the proximal end; and
   an intermediate balloon fixedly attached to the shaft, the intermediate balloon disposed between the proximal balloon and the distal balloon,
   wherein the shaft defines a first lumen in fluid communication with a first reservoir defined by the proximal balloon and a second reservoir defined by the distal balloon and fluidically isolated from a third reservoir defined by the intermediate balloon, and the intermediate balloon is disposed closer to the distal balloon than to the proximal balloon.

2. The implantable device of claim 1, wherein the proximal balloon is disposed at the proximal end of the shaft, and the distal balloon is disposed at the distal end of the shaft.

3. The implantable device of claim 1, wherein the shaft has a first diameter in a direction perpendicular to the longitudinal axis, the distal balloon is expandable to an expanded configuration in which the distal balloon has a second diameter in the direction perpendicular to the longitudinal axis, and the second diameter is greater than the first diameter.

4. The implantable device of claim 1, wherein the shaft has a first diameter in a direction perpendicular to the longitudinal axis, the intermediate balloon is expandable to an expanded configuration in which the intermediate balloon has a second diameter in the direction perpendicular to the longitudinal axis, and the second diameter is greater than the first diameter.

5. The implantable device of claim 1, wherein the shaft further comprises a second lumen in fluid communication with the third reservoir of the intermediate balloon and fluidically isolated from the first reservoir of the proximal balloon and the second reservoir of the distal balloon.

6. The implantable device of claim 1, wherein the shaft has a first diameter in a direction perpendicular to the longitudinal axis, the proximal balloon is expandable to an expanded configuration in which the proximal balloon has a second diameter in the direction perpendicular to the longitudinal axis, and the second diameter is greater than the first diameter.

7. An implantable device for retracting prostatic tissue of a patient, the implantable device comprising:
   a shaft having a proximal end and a distal end disposed opposite one another in a direction of a longitudinal axis of the shaft;
   a proximal balloon fixedly attached to the shaft, the proximal balloon disposed closer to the proximal end than to the distal end;
   a distal balloon fixedly attached to the shaft, the distal balloon disposed closer to the distal end than to the proximal end; and
   an intermediate balloon fixedly attached to the shaft, the intermediate balloon disposed between the proximal balloon and the distal balloon,
   wherein the shaft defines a first lumen in fluid communication with a first reservoir defined by the proximal balloon and a second reservoir defined by the distal balloon and fluidically isolated from a third reservoir defined by the intermediate balloon, and the shaft further comprises a second lumen in fluid communication with the third reservoir of the intermediate balloon and fluidically isolated from the first reservoir of the proximal balloon and the second reservoir of the distal balloon.

8. The implantable device of claim 7, wherein the intermediate balloon is disposed closer to the distal balloon than to the proximal balloon.

9. The implantable device of claim 7, wherein the proximal balloon is disposed at the proximal end of the shaft, and the distal balloon is disposed at the distal end of the shaft.

10. The implantable device of claim 7, wherein the shaft has a first diameter in a direction perpendicular to the longitudinal axis, the proximal balloon is expandable to an expanded configuration in which the proximal balloon has a second diameter in the direction perpendicular to the longitudinal axis, and the second diameter is greater than the first diameter.

11. The implantable device of claim 7, wherein the shaft has a first diameter in a direction perpendicular to the longitudinal axis, the distal balloon is expandable to an expanded configuration in which the distal balloon has a second diameter in the direction perpendicular to the longitudinal axis, and the second diameter is greater than the first diameter.

12. The implantable device of claim 7, wherein the shaft has a first diameter in a direction perpendicular to the longitudinal axis, the intermediate balloon is expandable to an expanded configuration in which the intermediate balloon has a second diameter in the direction perpendicular to the longitudinal axis, and the second diameter is greater than the first diameter.

13. An implantable device for retracting prostatic tissue of a patient, the implantable device comprising:
a shaft having a proximal end and a distal end disposed opposite one another in a direction of a longitudinal axis of the shaft;
a proximal balloon fixedly attached to the shaft, the proximal balloon disposed closer to the proximal end than to the distal end;
a distal balloon fixedly attached to the shaft, the distal balloon disposed closer to the distal end than to the proximal end; and
an intermediate balloon fixedly attached to the shaft, the intermediate balloon disposed between the proximal balloon and the distal balloon,
wherein the shaft defines a first lumen in fluid communication with a first reservoir defined by the proximal balloon and a second reservoir defined by the distal balloon and fluidically isolated from a third reservoir defined by the intermediate balloon, and the shaft has a first diameter in a direction perpendicular to the longitudinal axis, the proximal balloon, the distal balloon, or the intermediate balloon is expandable to an expanded configuration having a second diameter in the direction perpendicular to the longitudinal axis, and the second diameter is greater than the first diameter.

14. The implantable device of claim 13, wherein the intermediate balloon is disposed closer to the distal balloon than to the proximal balloon.

15. The implantable device of claim 13, wherein the proximal balloon is disposed at the proximal end of the shaft, and the distal balloon is disposed at the distal end of the shaft.

16. The implantable device of claim 13, wherein the shaft further comprises a second lumen in fluid communication with the third reservoir of the intermediate balloon and fluidically isolated from the first reservoir of the proximal balloon and the second reservoir of the distal balloon.

* * * * *